(12) United States Patent
Fujita et al.

(10) Patent No.: US 8,345,521 B2
(45) Date of Patent: Jan. 1, 2013

(54) OPTICAL DISC APPARATUS AND SIGNAL GENERATION METHOD

(75) Inventors: Goro Fujita, Kanagawa (JP); Hirotaka Miyamoto, Kanagawa (JP); Kimihiro Saito, Saitama (JP); Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 750 days.

(21) Appl. No.: 12/511,566

(22) Filed: Jul. 29, 2009

(65) Prior Publication Data

US 2010/0027403 A1 Feb. 4, 2010

(30) Foreign Application Priority Data

Jul. 31, 2008 (JP) ................................ P2008-198447

(51) Int. Cl.
*G11B 15/04* (2006.01)

(52) U.S. Cl. ................................ 369/53.22; 369/53.28

(58) Field of Classification Search .......................... None
See application file for complete search history.

(56) References Cited

U.S. PATENT DOCUMENTS

| | | | | |
|---|---|---|---|---|
| 6,101,157 A * | 8/2000 | Bradshaw et al. | ......... | 369/44.35 |
| 7,193,953 B2 | 3/2007 | Kim | | |
| 7,706,233 B2 | 4/2010 | Horimai et al. | | |
| 7,916,585 B2 * | 3/2011 | Saito | ............ | 369/44.27 |
| 7,933,188 B2 * | 4/2011 | Kimura et al. | ............ | 369/112.01 |
| 2002/0191501 A1 * | 12/2002 | Ueno | ......................... | 369/44.13 |
| 2006/0092778 A1 * | 5/2006 | Shibuya et al. | ............. | 369/44.23 |
| 2008/0089209 A1 * | 4/2008 | Miyamoto et al. | ........ | 369/112.23 |
| 2008/0239924 A1 * | 10/2008 | Fujita et al. | ................. | 369/112.1 |
| 2008/0316902 A1 * | 12/2008 | Saito et al. | ............... | 369/112.23 |
| 2009/0147652 A1 | 6/2009 | Fujita | | |
| 2009/0168632 A1 | 7/2009 | Miyamoto et al. | | |
| 2009/0285059 A1 | 11/2009 | Fujita et al. | | |
| 2010/0046345 A1 | 2/2010 | Fujita et al. | | |

FOREIGN PATENT DOCUMENTS

| | | |
|---|---|---|
| JP | 62-020147 | 1/1987 |
| JP | 04-321934 A | 11/1992 |
| JP | 10-064104 A | 3/1998 |

(Continued)

OTHER PUBLICATIONS

Toriumi et al., "Reflection confocal microscope readout system for three-dimensional photochromic optical data storage", Optics Letters, vol. 23, Issue 24, pp. 1924-1926 (1998).

*Primary Examiner* — Paul Huber
(74) *Attorney, Agent, or Firm* — Wolf, Greenfield & Sacks, P.C.

(57) ABSTRACT

An optical disc apparatus includes a light separator configured to separate a light beam emitted from a light source into a main beam and a sub-beam, an objective lens configured to, when the light beam is condensed and irradiated to an optical disc having a uniform recording layer in which a track is formed by record marks, irradiate at least part of the sub-beam to an area where the main beam is not irradiated in a radial direction which is defined as a direction of radius of the optical disc, and a signal generating unit configured to generate a mark layer distance signal, representing a distance between a focus of the light beam and a mark layer to which the track belongs, based on a return light beam resulting from at least one of the main beam and the sub-beam, which has been irradiated to the track.

19 Claims, 36 Drawing Sheets

FOREIGN PATENT DOCUMENTS

| | | |
|---|---|---|
| JP | 10-308033 A | 11/1998 |
| JP | 11-296875 A | 10/1999 |
| JP | 11-328724 A | 11/1999 |
| JP | 2000-163795 A | 6/2000 |
| JP | 2001-325748 A | 11/2001 |
| JP | 2002-334433 A | 11/2002 |
| JP | 2003-077157 A | 3/2003 |
| JP | 2003-132586 A | 5/2003 |
| JP | 2003-217142 A | 7/2003 |
| JP | 2005-037658 A | 2/2005 |
| JP | 2007-042149 A | 2/2007 |
| JP | 2007-179676 A | 7/2007 |
| JP | 2007-220206 A | 8/2007 |
| JP | 2007-287245 A | 11/2007 |
| JP | 2008-017433 A | 1/2008 |
| JP | 2008-071433 | 3/2008 |
| WO | WO 2006/111972 A2 | 10/2006 |

\* cited by examiner

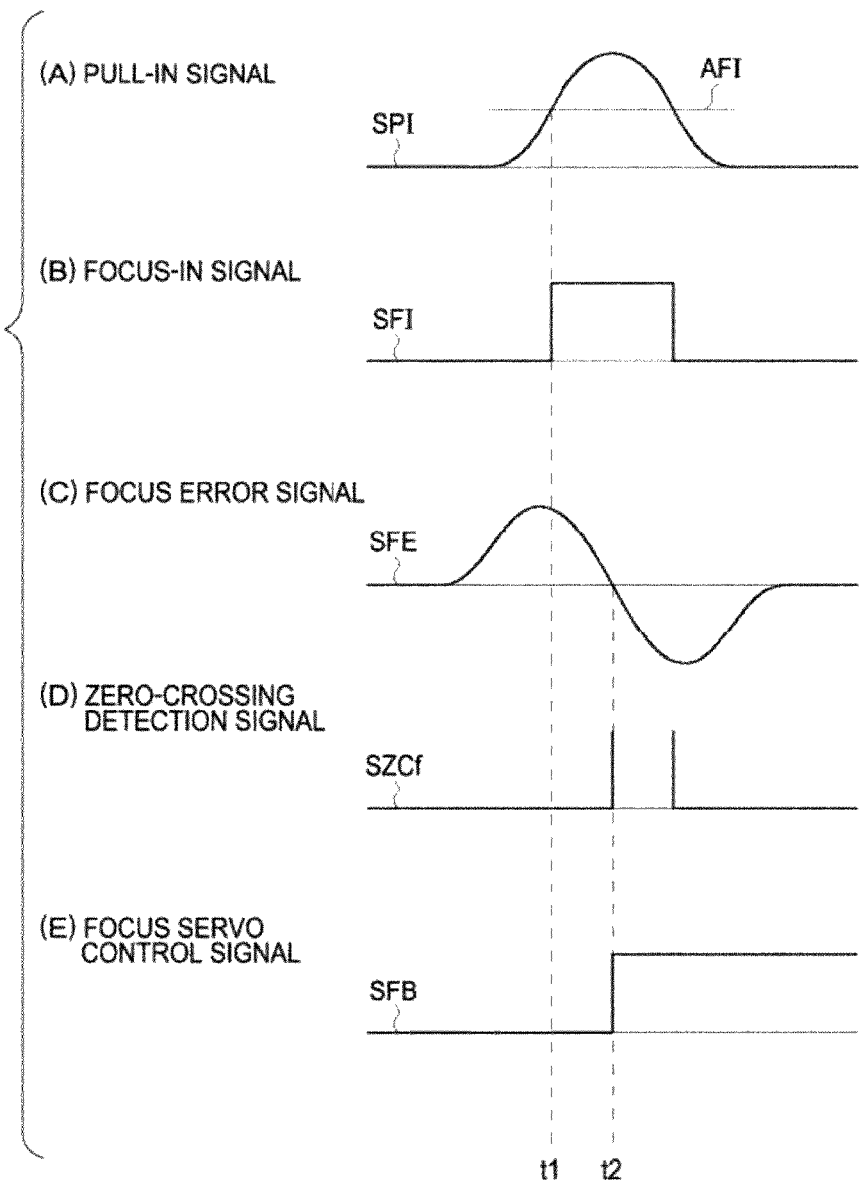

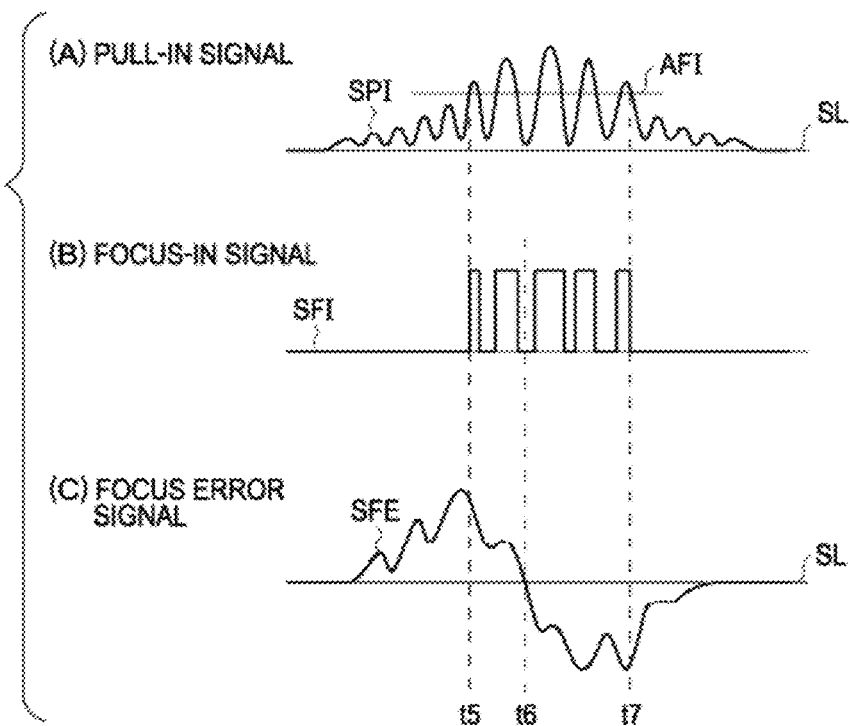

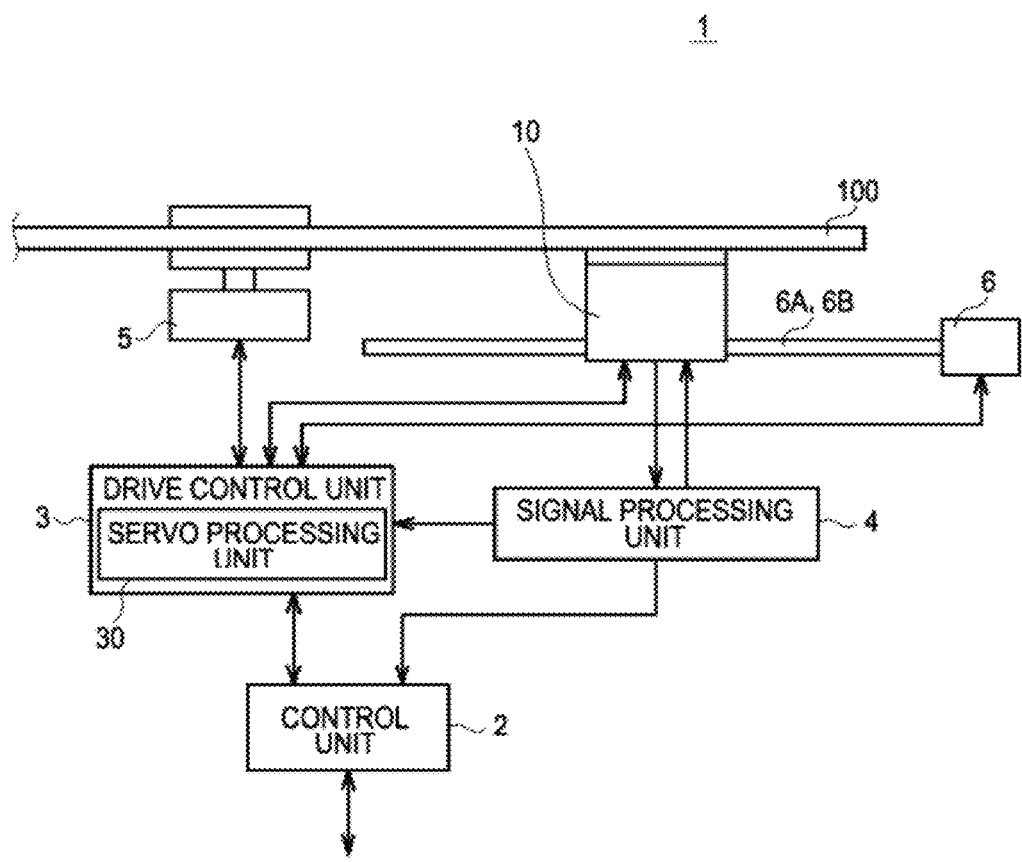

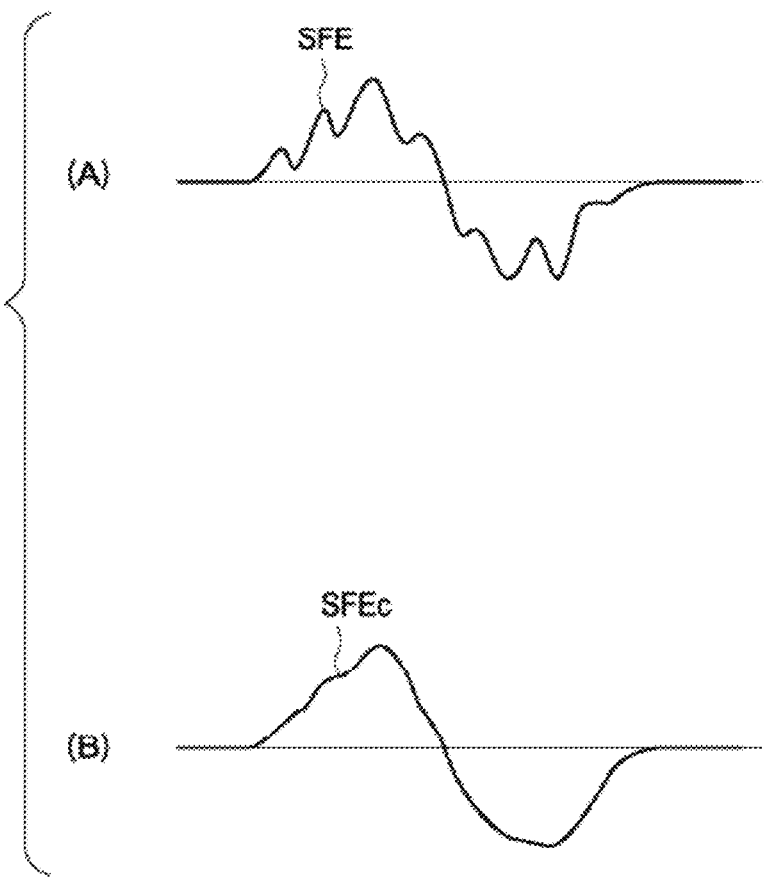

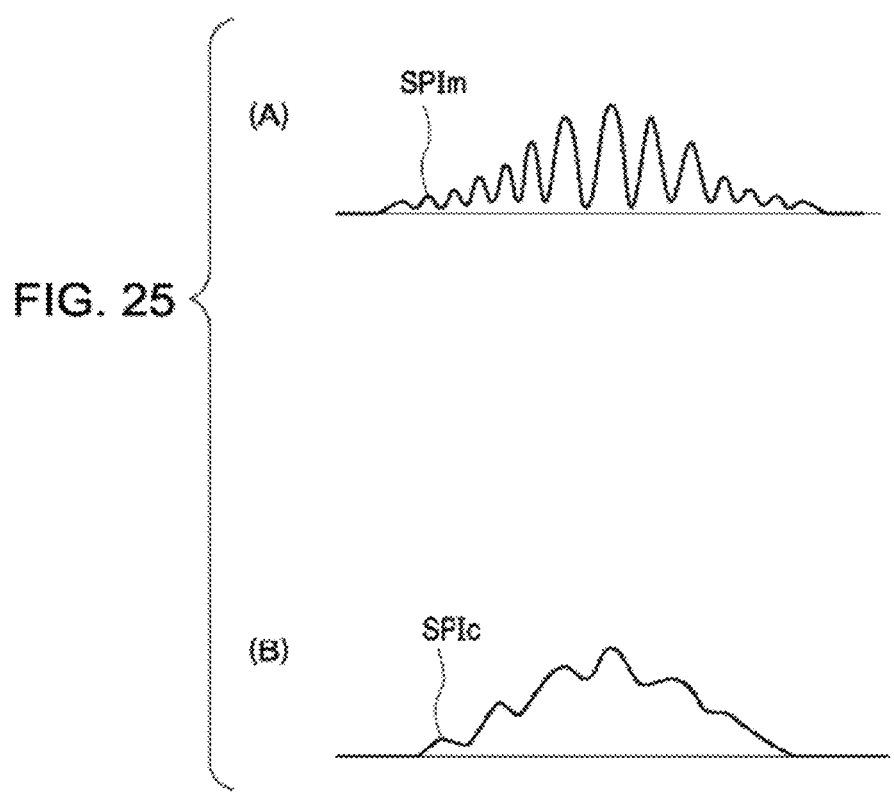

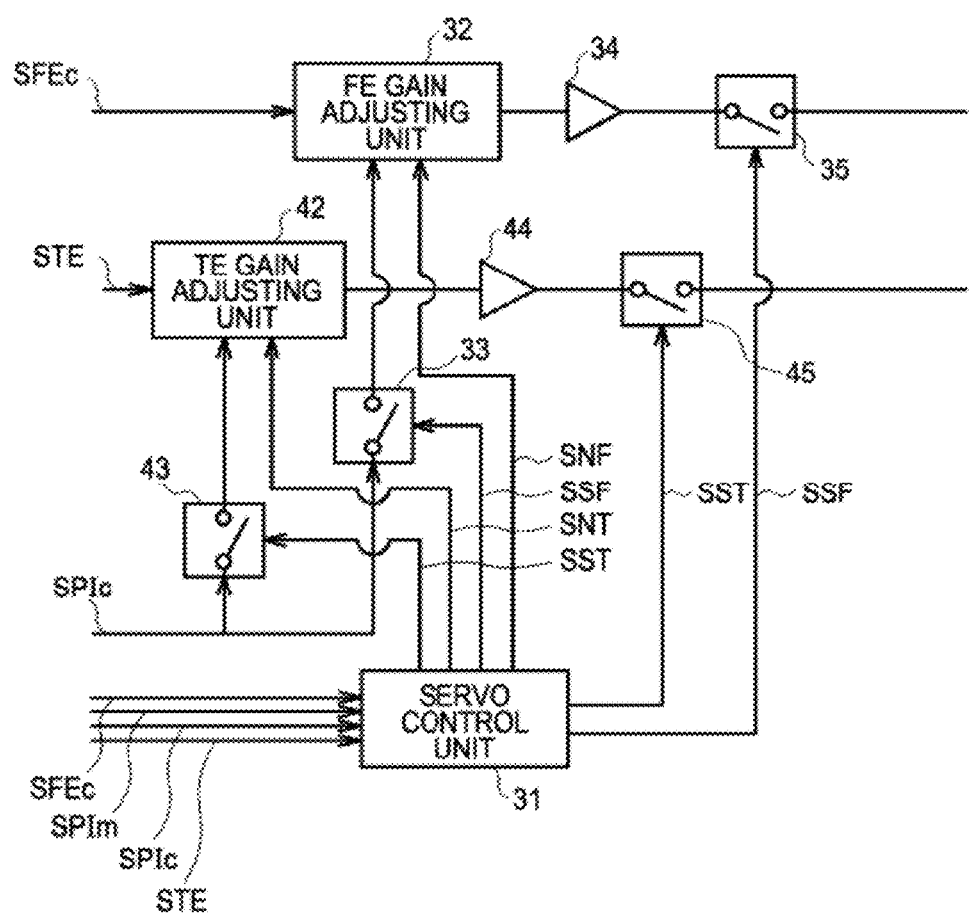

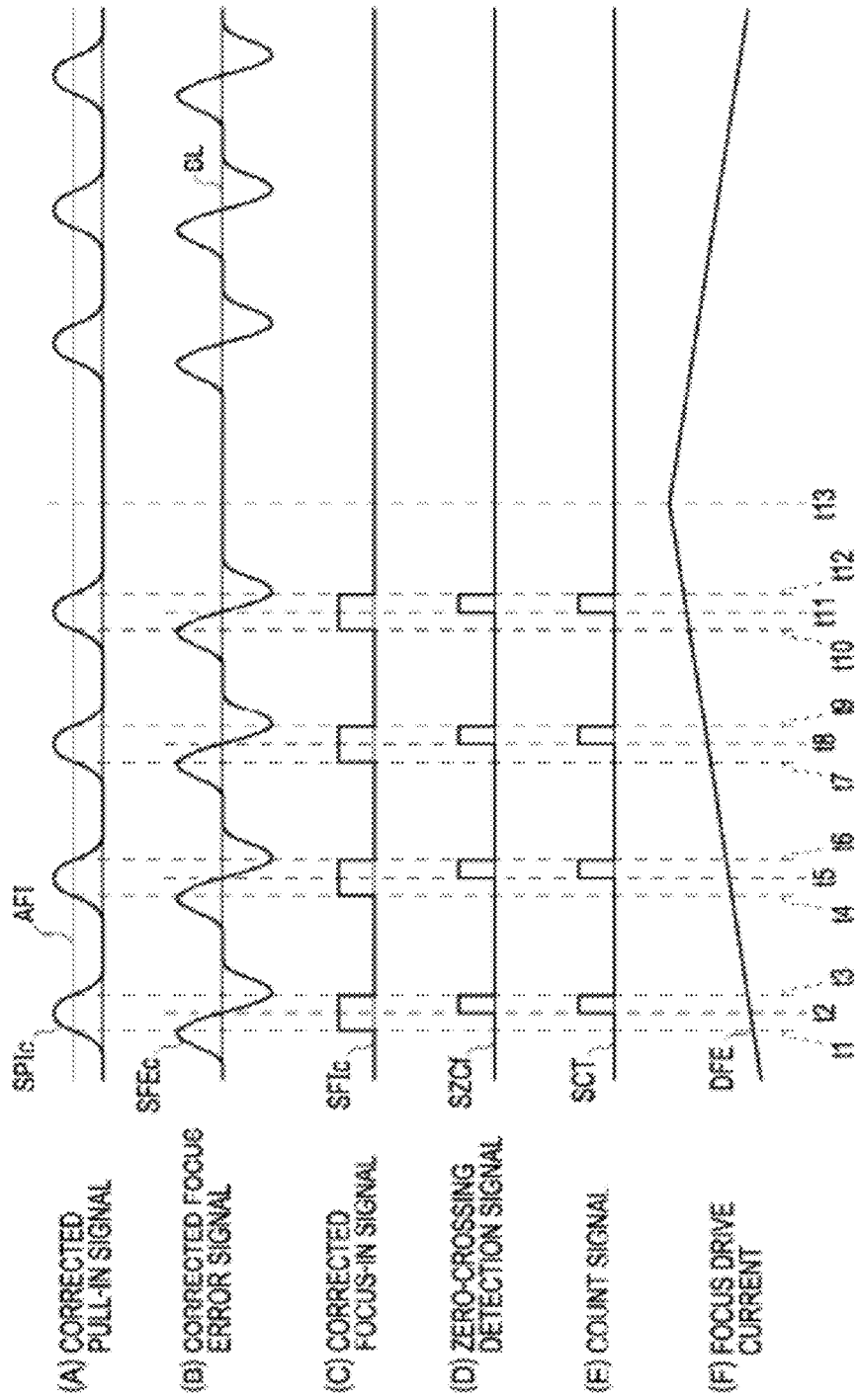

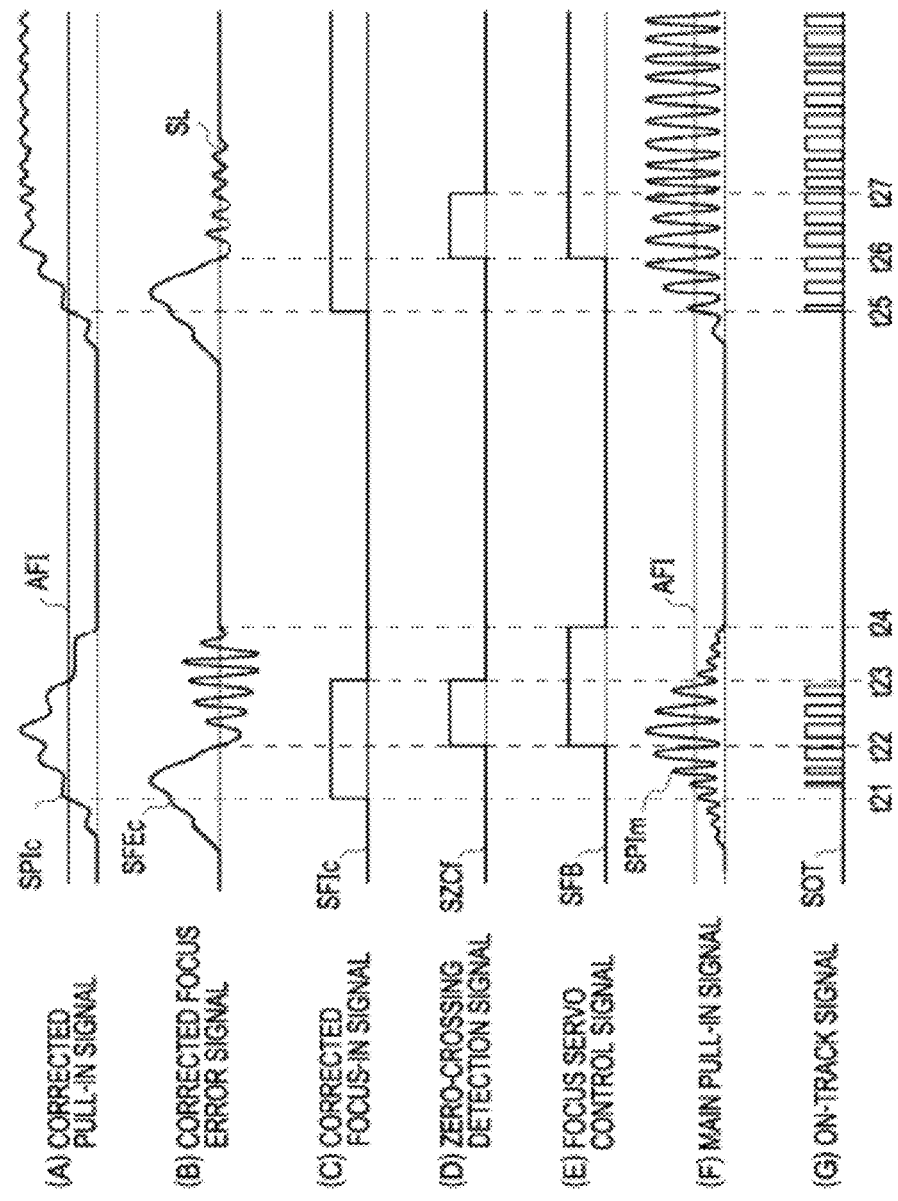

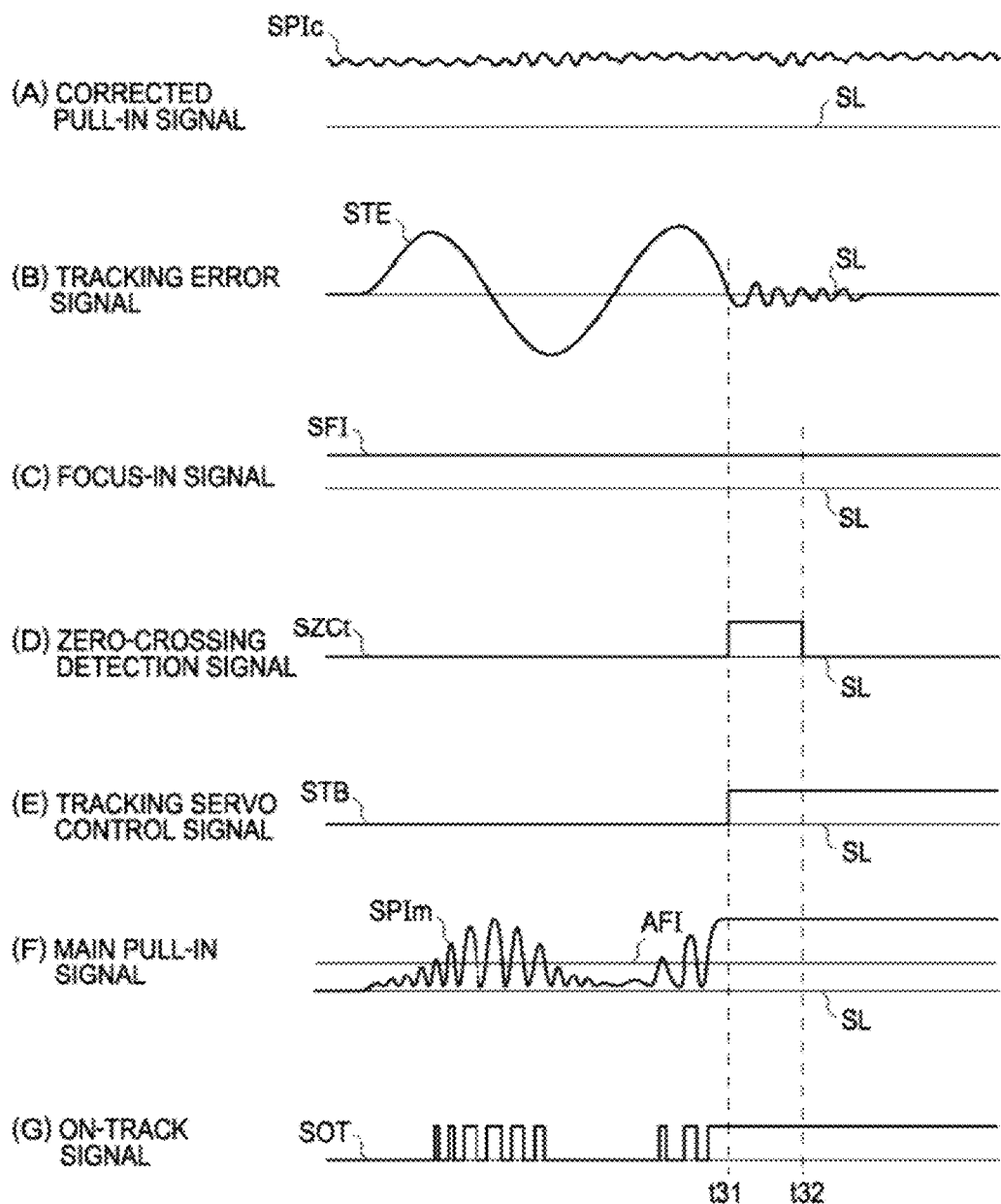

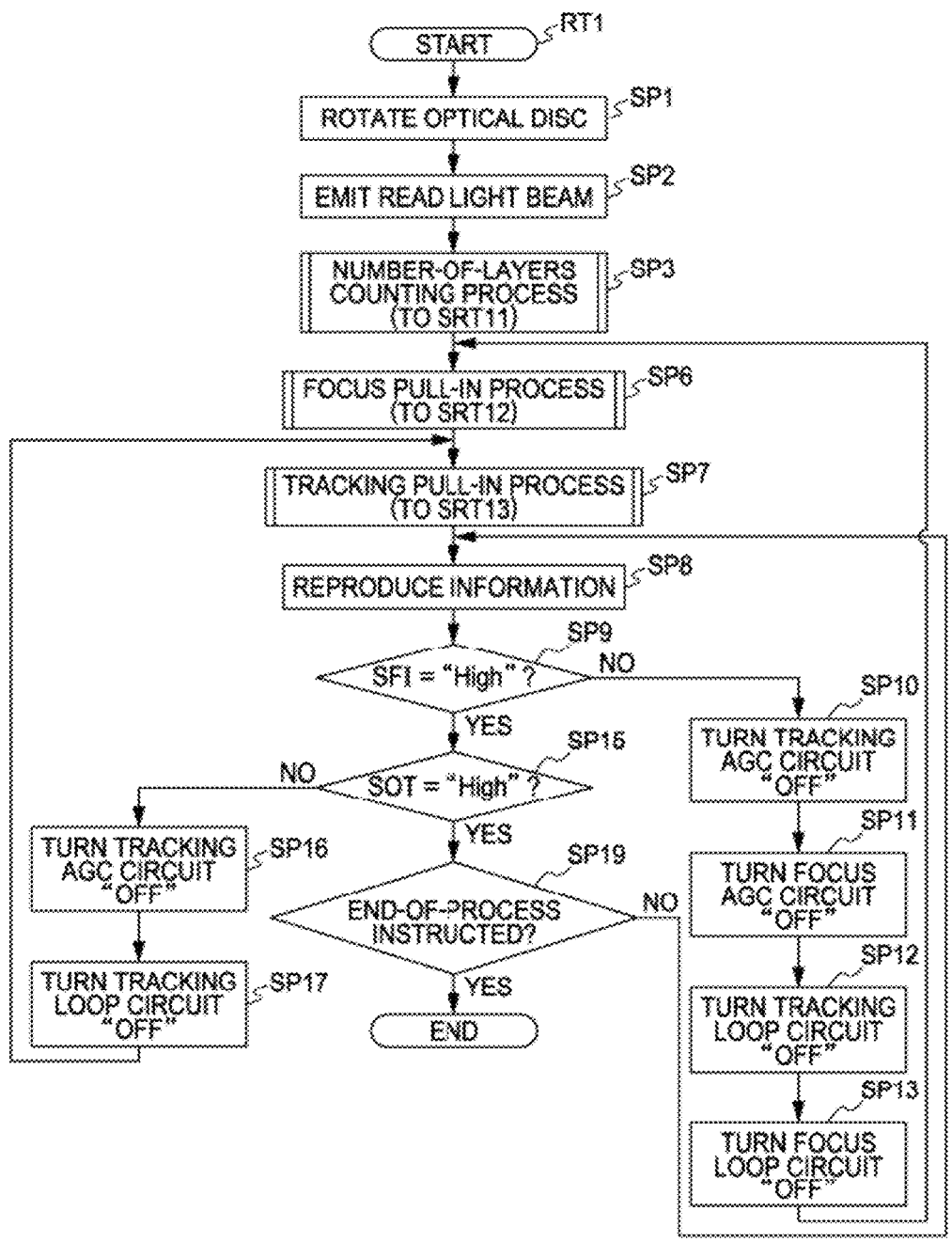

FIG. 36
120
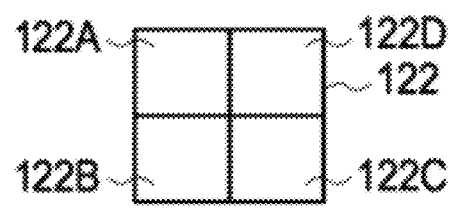
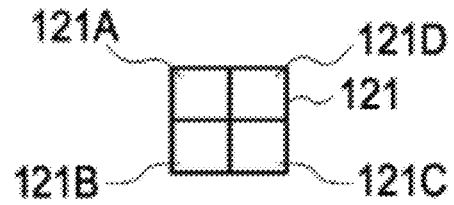
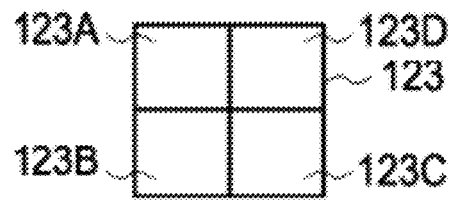

OPTICAL DISC APPARATUS AND SIGNAL GENERATION METHOD

BACKGROUND OF THE INVENTION

1. Field of the Invention

The present invention relates to an optical disc apparatus and a signal generation method. The present invention is suitably applied to, for example, an optical disc apparatus for reproducing information from an optical disc in which record marks are formed in a uniform recording layer.

2. Description of the Related Art

In the field of optical disc apparatuses, ordinary optical discs having signal recording layers, e.g., a CD (Compact Disc), a DVD (Digital Versatile Disc), and a Blu-ray Disc (registered trademark, hereinafter referred to as a "BD"), have hitherto been widely used. In such an optical disc apparatus, information is reproduced by irradiating a light (optical) beam to a target track in the signal recording layer where the light beam is to be irradiated (hereinafter referred to as a "desired track"), and by reading light reflected at the desired track.

In that type of related-art optical disc apparatus, when the light beam is irradiated to the signal recording layer, the irradiated light beam is reflected at the signal recording layer such that the reflected light can be received in predetermined or more quantity. In the related-art optical disc apparatus, therefore, various error signals indicating deviations of the light beam from the desired track (e.g., a focus error signal and a tracking error signal) are generated based on the reflected light, and servo control is executed so as to irradiate the light beam to the desired position.

Also, in that type of related-art optical disc apparatus, information is recorded by irradiating a light beam to the signal recording layer of the optical disc, thus changing, e.g., local reflectance of the signal recording layer.

In the optical disc, it is common knowledge that the size of a beam spot formed when the light beam is condensed (focused) through an objective lens, etc., is approximately expressed by $\lambda/NA$ ($\lambda$: wavelength of the light beam and NA: numerical aperture) and resolution is also proportional to such a value. According to the BD technique, for example, data of about 25 GB can be recorded per layer of an optical disc with a diameter of 120 mm.

Optical discs are generally used to record various contents, e.g., music contents and image (video) contents, and various kinds of information, e.g., various data for use in computers. In recent years, particularly, an amount of information handled has increased with higher definition of images and higher sound quality of music, and an increase in the number of contents recorded on one optical disc has been demanded. Thus, an optical disc having a larger capacity has been demanded.

In view of those demands, an optical disc apparatus is proposed in which standing waves are recorded as record marks in a uniform recording layer of an optical disc by utilizing, e.g., a hologram, and the recording layer is formed plural in one disc for the purpose of simplifying the optical disc and increasing the disc capacity (see, e.g., Japanese Unexamined Patent Application Publication No. 2008-71433).

In the proposed optical disc apparatus, a light beam is irradiated to a mark layer in the optical disc, which includes record marks therein, and a return light beam returning from the optical disc is received. Further, in the proposed optical disc apparatus, information is reproduced by detecting the presence or the absence of the record marks based on the return light beam reflected at the record marks.

SUMMARY OF THE INVENTION

In the related-art optical disc apparatus, as illustrated at (A) in FIG. 1, when a signal level of a pull-in signal SPI representing the sum quantity of a light beam reaches a predetermined focus-in threshold AFI at a time point t1, a focus-in signal SF1 ((B) in FIG. 1) is raised to a "High" level based on determination that the focus of the light beam is in the vicinity of a signal recording surface.

Further, in the related-art optical disc apparatus, when a zero-crossing point is detected at a time point t2 from a focus error signal SFE ((C) in FIG. 1), a focus servo control signal SFB ((E) in FIG. 1) is raised to start focus servo control.

Thus, in the related-art optical disc apparatus, the pull-in signal SPI representing the sum quantity of return light corresponds to the distance from the focus of the light beam to the signal recording surface. The timing of detecting the zero-crossing point is determined by utilizing such a characteristic that as the focus of the light beam comes closer to the signal recording surface, the level of the pull-in signal increases.

On the other hand, in the optical disc adapted for the optical disc apparatus proposed in Japanese Unexamined Patent Application Publication No. 2008-71433, the recording layer is uniform and does not include a signal recording surface. Record marks are formed on one plane as a mark layer such that the record marks are arrayed in a scattered state. In the proposed optical disc apparatus, therefore, a signal level of a pull-in signal SPI greatly varies, as illustrated at (A) in FIG. 2, depending whether the focus of the light beam is positioned on a recording mark train (i.e., a track), thus resulting in a comb-like waveform.

Because the signal level of such a pull-in signal SPI repeatedly varies to exceed above a focus-in threshold AF1 and below the focus-in threshold AF1, a focus-in signal SFI is caused to rise and fall repeatedly. Hence, the timing of detecting the zero-crossing point is not determined by using the pull-in signal.

Further, as illustrated at (C) in FIG. 2, the waveform of a focus error signal SFE is also deformed to a large extent. Accordingly, the focus error signal SFE does not precisely represent a deviation between the focus of the light beam and the mark layer. This results in a possibility that a control system may become unstable even when focus control is started upon detection of the zero-crossing point.

In other words, the optical disc apparatus described in Japanese Unexamined Patent Application Publication No. 2008-71433 has the problem that the pull-in signal SPI and the focus error signal SFE do not precisely represent the distance from the focus of the light beam to the mark layer.

The present invention addresses the above-identified problems by providing an optical disc apparatus and a signal generation method, which can generate a mark layer distance signal representing a distance from a focus of a light beam to a mark layer.

According to one embodiment of the present invention, a light beam emitted from a light source is separated into a main beam and a sub-beam, and the light beam is condensed and irradiated to an optical disc having a uniform recording layer in which a track is formed by record marks. At that time, at least part of the sub-beam is irradiated to an area where the main beam is not irradiated in a radial direction of the optical disc, which is defined as a direction of radius of the optical disc. A mark layer distance signal representing a distance between a focus of the light beam to a mark layer, to which the track belongs, is generated based on a return light beam resulting from at least one of the main beam and the sub-beam, which has been irradiated to the track.

With those features, the mark layer distance signal can be generated based on the return light beam resulting from the beam irradiation to the track.

According to another embodiment of the present invention, an optical disc apparatus includes a light separator configured to separate a light beam emitted from a light source into a main beam and a sub-beam, an objective lens configured to, when the light beam is condensed and irradiated to an optical disc having a uniform recording layer in which a track is formed by record marks, irradiate the sub-beam or both the main beam and the sub-beam to both the track and a space area where the track is not formed, and a signal generating unit configured to generate a mark layer distance signal representing a distance between a focus of the light beam and a mark layer to which the track belongs, based on one or more return light beams resulting from the sub-beam or both the main beam and the sub-beam which have been irradiated to both the track and the space area.

With those features, the mark layer distance signal can be generated based on the return light beams related to the entirety (i.e., the track and the space area) of the mark layer.

According to the embodiment of the present invention, the optical disc apparatus and the signal generation method are realized which can generate the mark layer distance signal based on the return light beam resulting from the beam irradiation to the track, and hence which can generate the mark layer distance signal representing the distance from the focus of the light beam to the mark layer.

According to the embodiment of the present invention, the optical disc apparatus and the signal generation method are realized which can generate the mark layer distance signal based on the return light beam related to the entirety of the mark layer, and hence which can generate the mark layer distance signal representing the distance from the focus of the light beam to the mark layer.

BRIEF DESCRIPTION OF THE DRAWINGS

FIG. 1 illustrates charts to explain a focus pull-in process in the related art;

FIG. 2 illustrates charts indicating a pull-in signal and a focus error signal;

FIG. 21 is a schematic view illustrating a configuration of an optical disc apparatus;

FIG. 24 illustrates charts representing waveforms of the focus error signal and a corrected focus error signal;

FIG. 25 illustrates charts representing waveforms of the pull-in signal and a corrected pull-in signal;

FIG. 26 is a block diagram illustrating a configuration of a servo processing unit;

FIG. 27 illustrates charts representing various signals in a number-of-layers counting process;

FIG. 28 illustrates charts representing various signals in a focus pull-in process;

FIG. 29 illustrates charts representing various signals in a tracking pull-in process;

FIG. 30 is a flowchart to explain a procedure for an information reproducing process;

FIG. 36 illustrates a construction of a photodetector according to the second embodiment.

DESCRIPTION OF THE PREFERRED EMBODIMENTS

Embodiments of the present invention will be described in detail below with reference to the drawings.

(1) First Embodiment (1-1) Structure of Optical Disc

First, the principle for reproducing information in a first embodiment is described. In the first embodiment, a record mark RM having a spatial (three-dimensional) shape is formed in a uniform recording layer 101 of an optical disc 100.

Figure 3A:
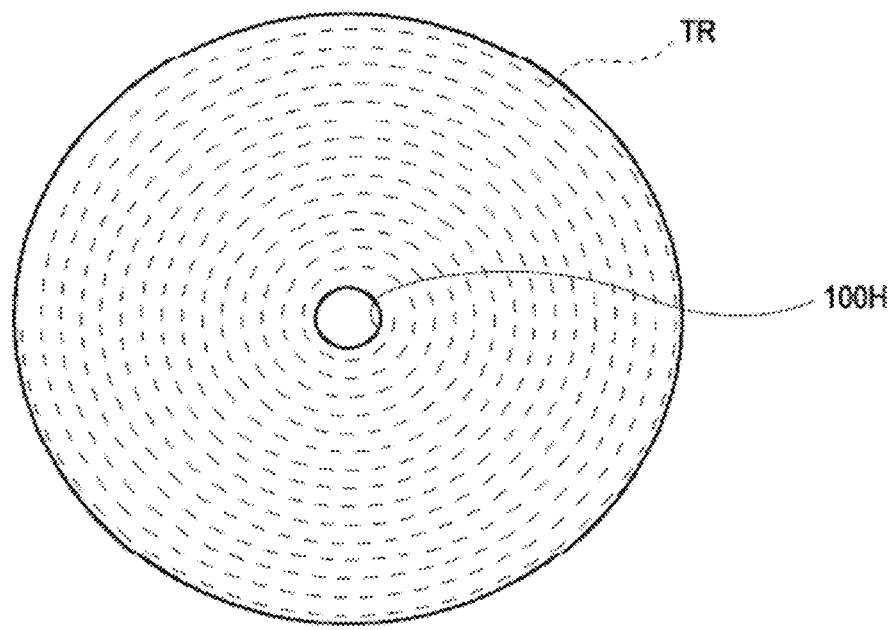
FIGS. 3A and 3B are schematic views illustrating a structure of an optical disc.

As seen from an appearance view of FIG. 3A, the optical disc 100 is entirely formed of a substantially circular disc and has a hole 100H formed at a center of the disc for chucking.

Figure 3B:
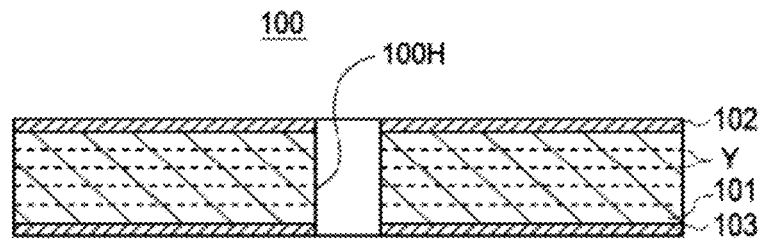

Further, as illustrated in FIG. 3B, the optical disc 100 has a structure that the recording layer 101 recording information is sandwiched at opposite surfaces thereof between base plates 102 and 103.

In the optical disc 100, the record marks RM are successively formed in a spiral pattern within the recording layer 101, thus forming a spiral track TR. The track TR is formed in the same plane within the recording layer 101 apart from a certain distance from the base plate 102, thus forming a mark layer Y.

The optical disc 100 includes a plurality of mark layers Y formed within the recording layer 101. FIG. 3B illustrates a case where four mark layers Y are formed.

Figure 4:
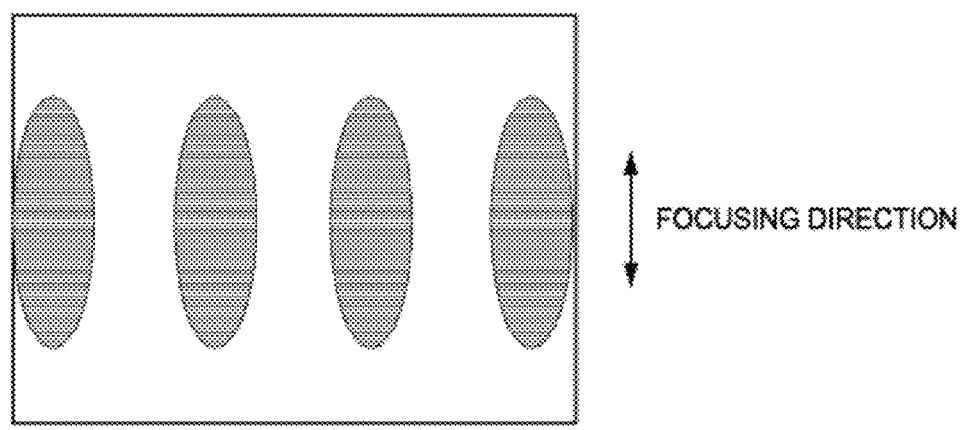
FIG. 4 illustrates states of record marks.
Figure 5A:
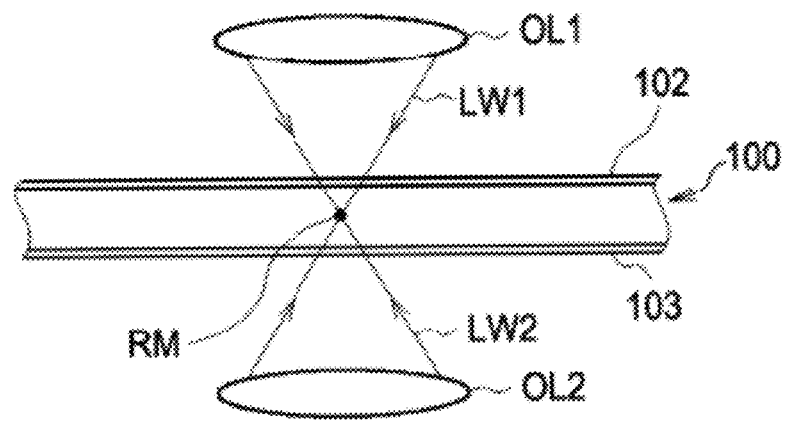
FIGS. 5A and 5B are illustrations to explain recording and reproducing of information.

As illustrated in FIG. 4, the record mark RM is formed of a minute hologram. More specifically, as illustrated in FIG. 5A, the record mark RM is recorded in such a manner that a record (write) light beam LW emitted from one light source and having a wavelength of 405 nm is separated into two recording light beams LW1 and LW2, and that the two separated recording light beams LW1 and LW2 are irradiated to the optical disc from opposite sides (i.e., both sides covered with the base plates 102 and 103) through objective lenses OL1 and OL2 so as to cause interference.

In the optical disc 100, information is recorded by forming the record mark RM for "1" of binarized record data and by not forming the record mark RM for "0".

Figure 5B:
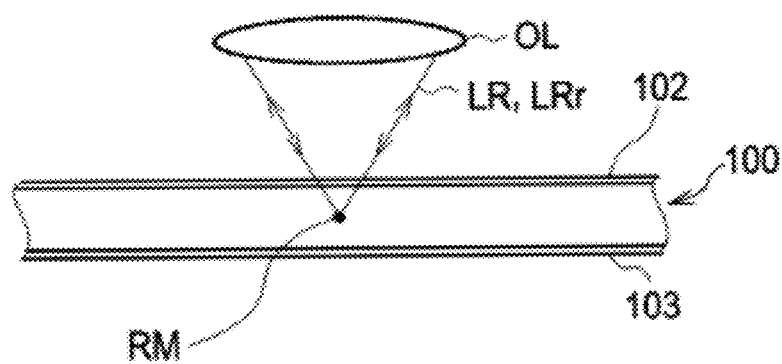

On the other hand, as illustrated in FIG. 5B, when a read light beam LR having a wavelength of 405 nm is irradiated to the record mark RM in the optical disc 100 from the side covered with the base plate 102 through an objective lens OL, the record light beam LW having been irradiated from the side covered with the base plate 103 in the recording mode is reproduced as a return light beam LRr that emerges from the base plate 102.

In an optical disc apparatus 1 (see FIG. 21), recorded information can be reproduced, for example, by assigning a code "1" when the record mark RM is formed, and a code "0" when the record mark RM is not formed.

Thus, in the optical disc 100, the track TR is formed by successively forming the record marks RM in a spiral pattern within the recording layer 101, and the mark layer Y is formed by forming the track TR in one plane.

(1-2) Cause of Comb-Like Pull-in Signal

The inventors have studied through simulation the cause why a pull-in signal SPI comes into a comb-like shape, as illustrated in FIG. 2A, when the read light beam LR is irradiated to the optical disc 100.

Figure 6A:
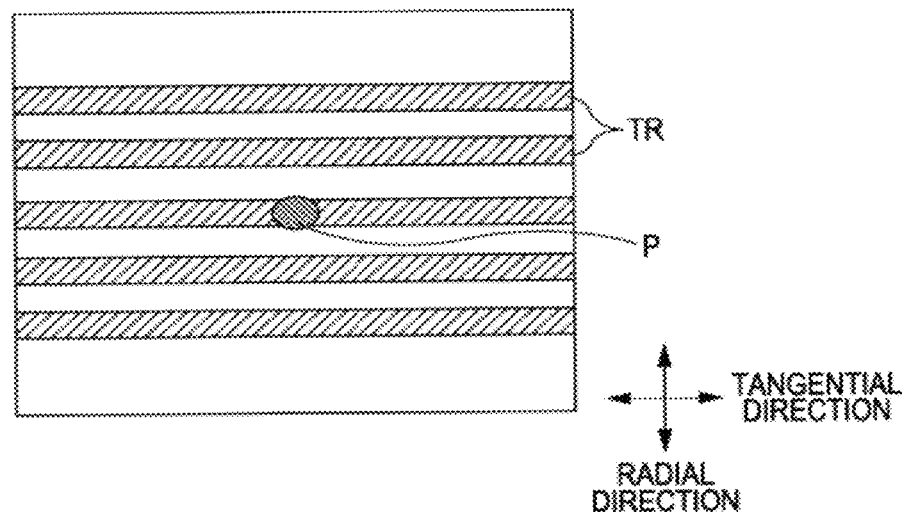
FIGS. 6A and 6B illustrate states of a spot and the record mark in the on-track condition.

In the simulation, as illustrated in FIG. 6A, only one spot P is formed in the recording layer 101 by one read light beam LR, and the return light beam LRr is generated by the read light beam LR.

Figure 7:
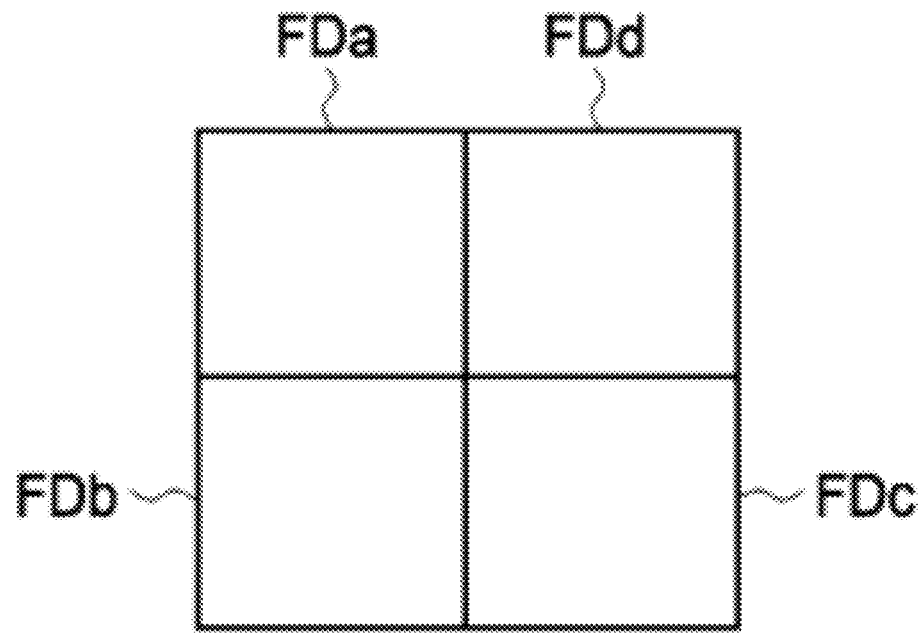
FIG. 7 is a schematic view illustrating a construction of a photodetector used in simulation.

In the simulation, the return light beam LRr is received by a photodetector FD having four detection areas FDa, FDb, FDc and FDd, as illustrated in FIG. 7, after adding astigmatism to the return light beam LRr. The detection areas FDa to FDd of the photodetector FD detect respective parts of the return light beam LRr and generate detection signals URa, URb, URc and URd (hereinafter referred to together as "detection signals URa to URd") depending on respective light quantities detected.

Further, in the simulation, a sum signal is generated from the detection signals URa to URd based on the following formula (1), and the pull-in signal SPI is generated by executing a LPF (Low Pass Filter) process on the sum signal:

$$SFE = (URa + URc) - (URb + URd) \quad (1)$$

Also, in the simulation, a focus error signal SFE is generated by using the astigmatism method based on the following formula (2):

$$SPI = URa + URb + URc + URd \quad (2)$$

Herein, when the center of the spot P of the read light beam LR is positioned at the center of the track TR as illustrated in FIG. 6A, this is called an "on-track condition".

Figure 6B:
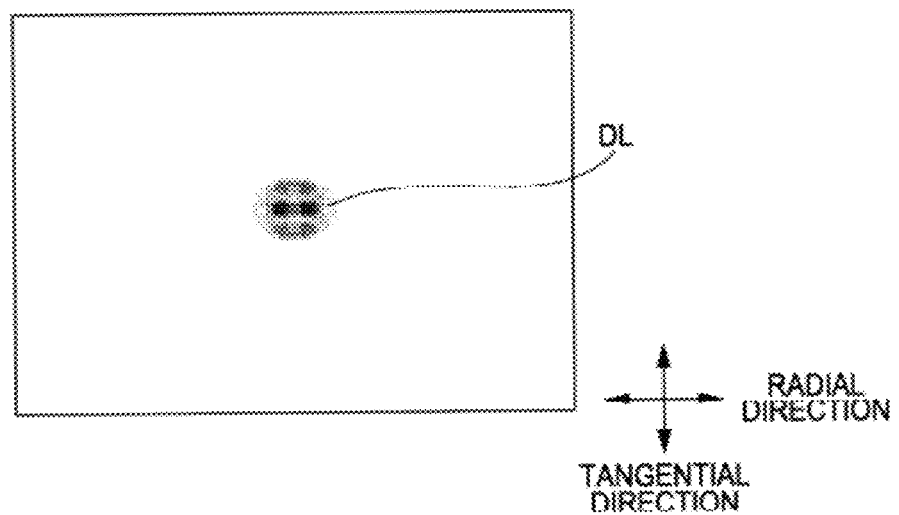

FIG. 6B illustrates a light intensity distribution (hereinafter referred to as an "on-pupil light intensity distribution DL") resulting when the return light beam LRr generated from the record mark RM is received through the objective lens OL in the on-track condition. Note that, in each illustration representing the light intensity distribution obtained with the simulation, the light intensity is expressed in dark and light tone while a portion having maximum light intensity is set as a reference. Namely, a portion having higher light intensity is drawn darker and a portion having lower light intensity is drawn lighter. As seen from FIG. 6B, the return light beam LRr has relatively high light intensity in its central portion and relatively low light intensity in its peripheral portion.

In the simulation, the wavelength of the read light beam LR is set to 405 nm, the NA (Numerical Aperture) of the objective lens OL is set to 0.51, the interval between the tracks TR (hereinafter referred to as the "track pitch TP") is set to 1.1 μm, and the resolution in the light intensity distribution is set to 128×128.

Figure 8:
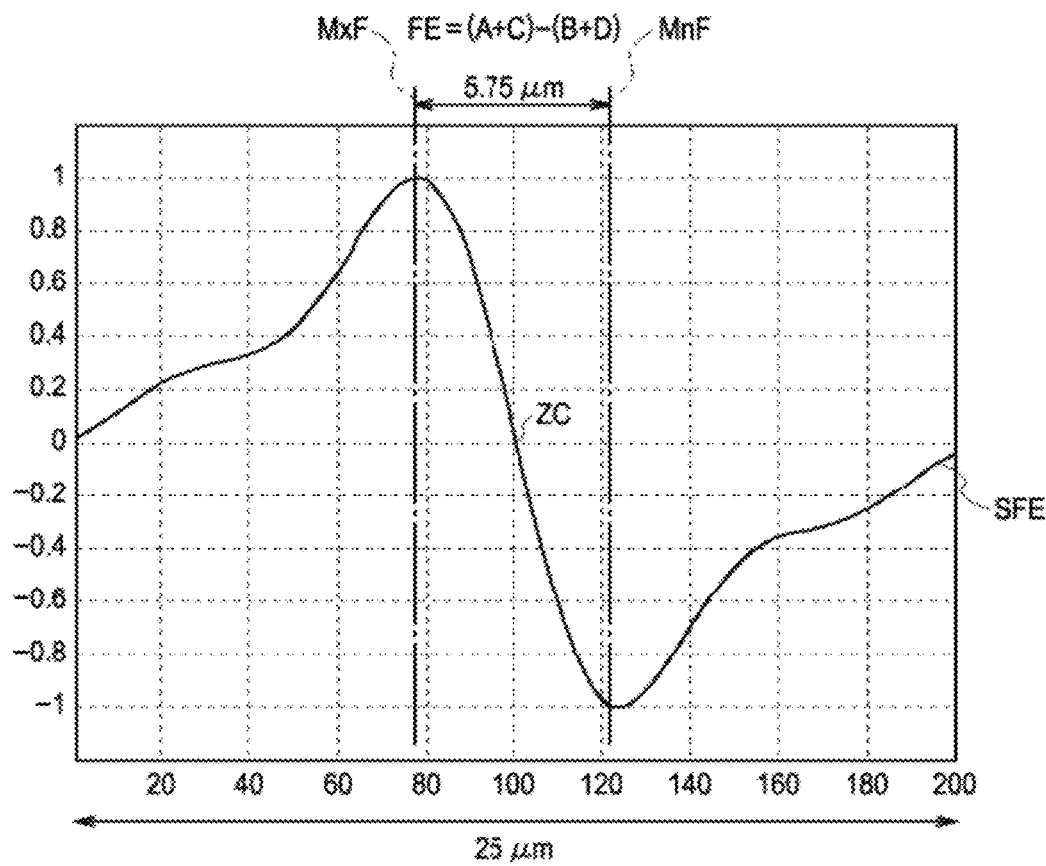
FIG. 8 is a graph illustrating a focus error signal in the on-track condition.

FIG. 8 illustrates the focus error signal SFE generated when the objective lens OL is moved in the focusing direction in the on-track condition. In a graph of FIG. 8, the horizontal axis is the time base and indicates that the objective lens OL has moved 25 μm in a time range from 0 to 200. The vertical axis denotes a signal level. This is similarly applied to other graphs described below.

In the on-track condition, as seen from FIG. 8, the focus error signal SFE defines an S-shaped curve with a large amplitude and has a steep slope near a zero-crossing point ZC at which the light beam is in focus with respect to the mark layer Y. An interval between a maximum point MxF and a minimum point MnF of the focus error signal SFE is about 5.75 μm.

Figure 9:
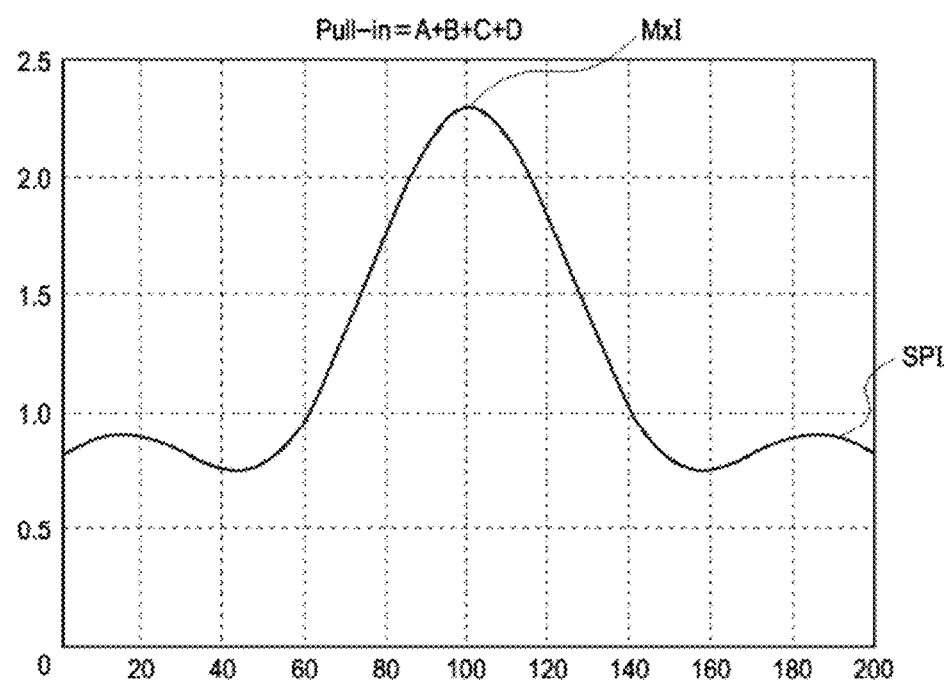
FIG. 9 is a graph illustrating a pull-in signal in the on-track condition.

FIG. 9 illustrates the pull-in signal SPI generated when the objective lens OL is moved in the focusing direction in the on-track condition. In the on-track condition, as seen from FIG. 9, the pull-in signal SPI has a very high signal level at a maximum point MxI where the light beam is in focus with respect to the mark layer Y.

Figure 10A:
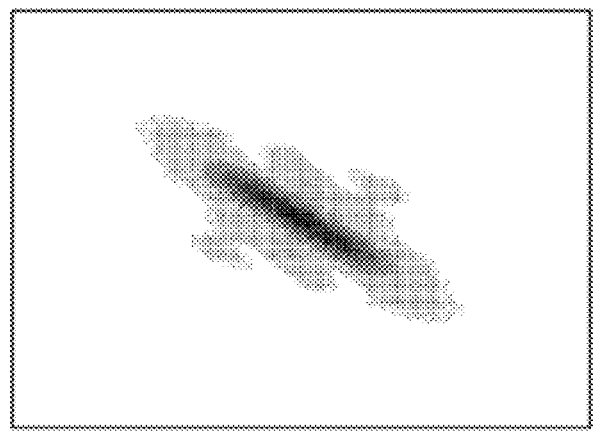
FIGS. 10A, 10B and 10C illustrate states of a return light spot in the on-track condition.
Figure 10B:
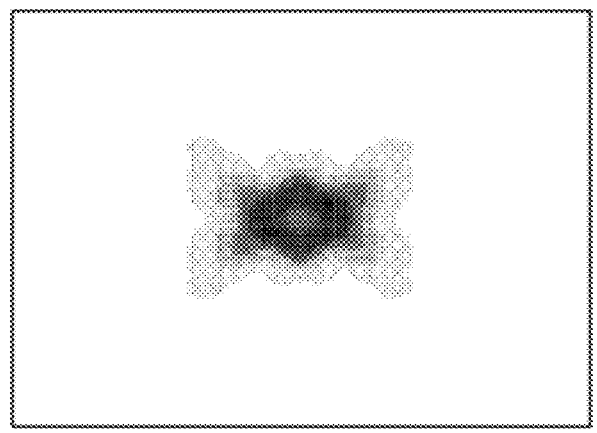
Figure 10C:
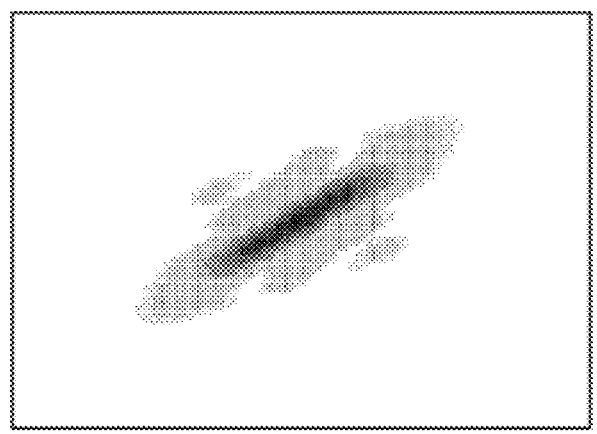

FIGS. 10A to 10C each illustrate a light intensity distribution in a spot (hereinafter referred to as a "return light spot Q") of the return light beam LRr that is received by the photodetector FD in the on-track condition. In more detail, FIGS. 10A and 10C illustrate the return light spots Q when the focus error signal SFE (FIG. 8) is at the maximum point MxF and the minimum point MnF, respectively. FIG. 10B illustrates the return light spot Q when the read light beam LR is in focus with respect to the mark layer Y.

Any of the return light spots Q has relatively high light intensity in its central portion and relatively low light intensity in its peripheral portion. In other words, a portion having high light intensity is concentrated at the center of the return light spot Q. Note that, because of adding astigmatism to the light beam, the read light beam LR has an elliptical shape tilted at about 45° in FIGS. 10A and 10C in which the read light beam LR is not in focus with respect to the mark layer Y.

Figure 11A:
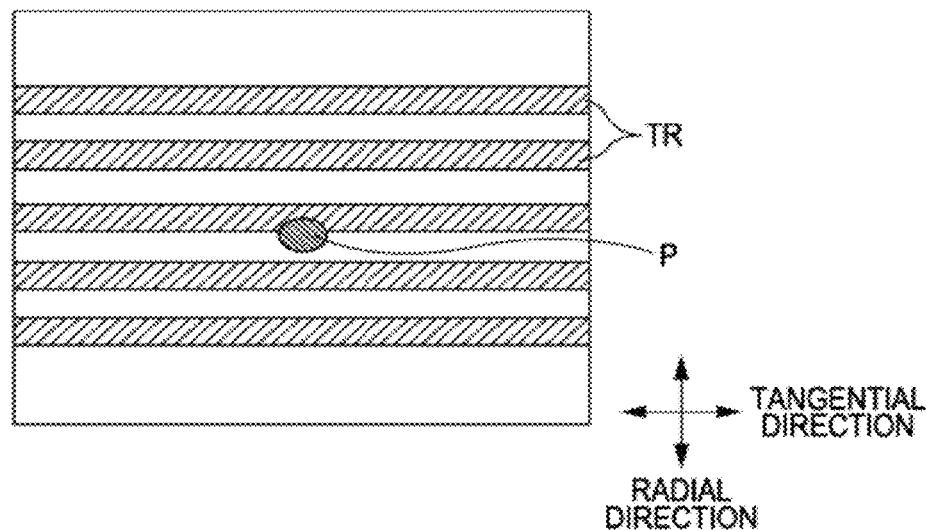
FIGS. 11A and 11B illustrate states of the spot and the record mark in the 0.31-µm de-track condition.
Figure 11B:
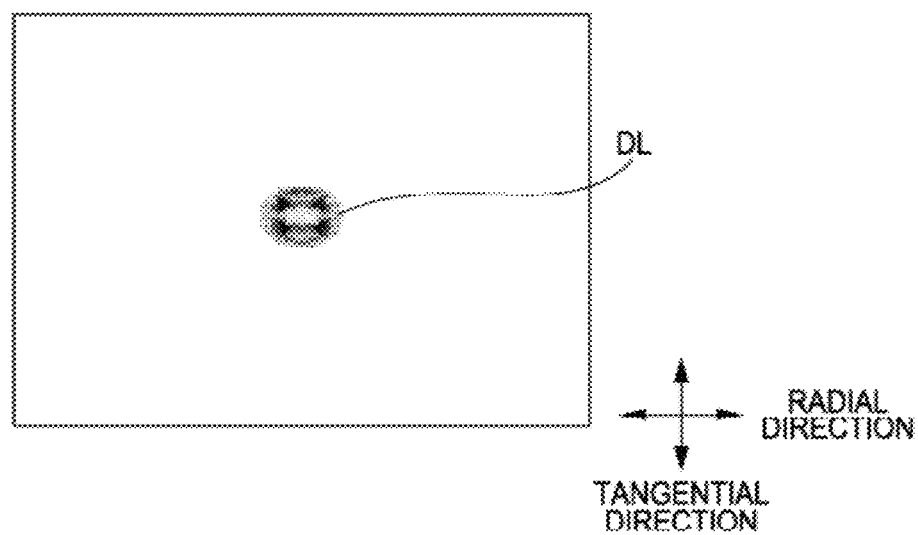

On the other hand, FIG. 11B illustrates the on-pupil light intensity distribution DL when the center of the spot P of the read light beam LR is de-tracked about 0.31 μm from the center of the track TR as illustrated in FIG. 11A.

In comparison with the on-track condition (FIG. 6B), as seen from FIG. 11B, a central portion has lower light intensity and a portion having high light intensity shifts outwards. Though not apparently seen from FIG. 11B because the light intensity distribution is expressed, as described above, in dark and light tone while a portion having maximum light intensity is set as a reference, a total light quantity of the return light beam LRr in the de-track condition (0.31 μm) is smaller than that in the on-track condition.

Figure 12:
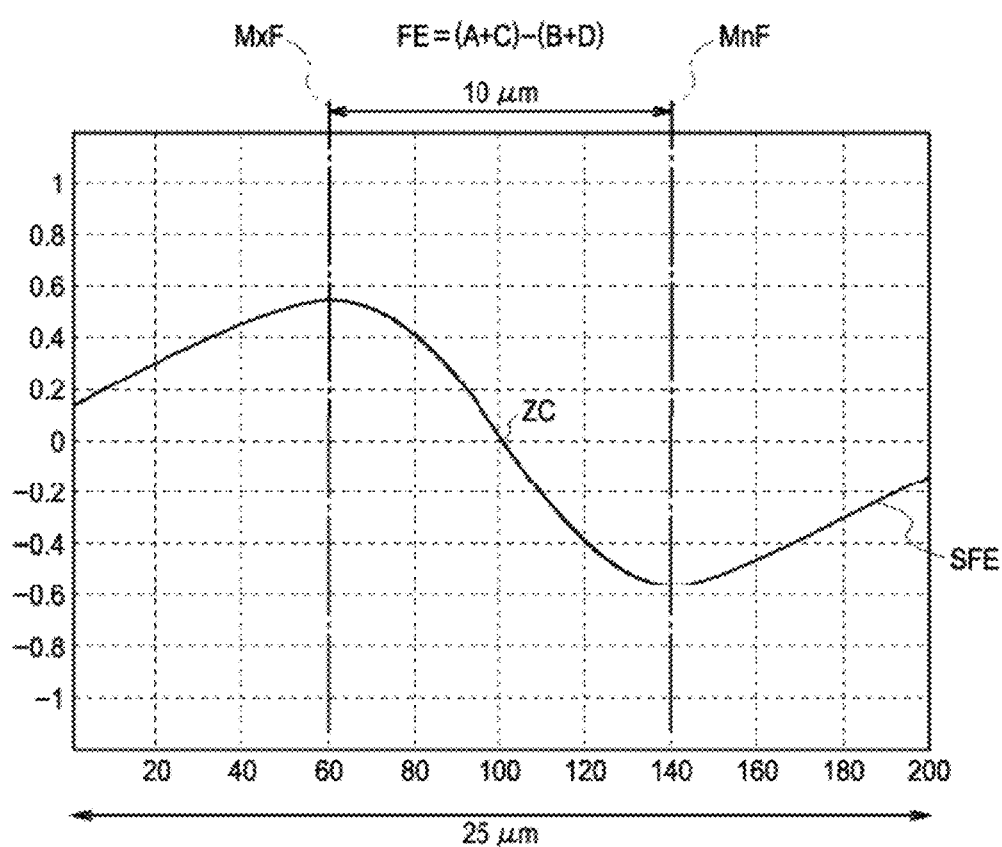
FIG. 12 is a graph illustrating the focus error signal in the 0.31-µm de-track condition.

FIG. 12 illustrates the focus error signal SFE generated when the objective lens OL is moved in the focusing direction in the de-track condition (0.31 μm). As seen from FIG. 12, the amplitude of the focus error signal SFE is reduced to a large extent from that in the on-track condition, and an interval between a maximum point MxF and a minimum point MnF of the focus error signal SFE is increased to about 10 μm.

It is thus understood that sensitivity of the focus error signal SFE is greatly reduced in the de-track condition (0.31 μm).

Figure 13:
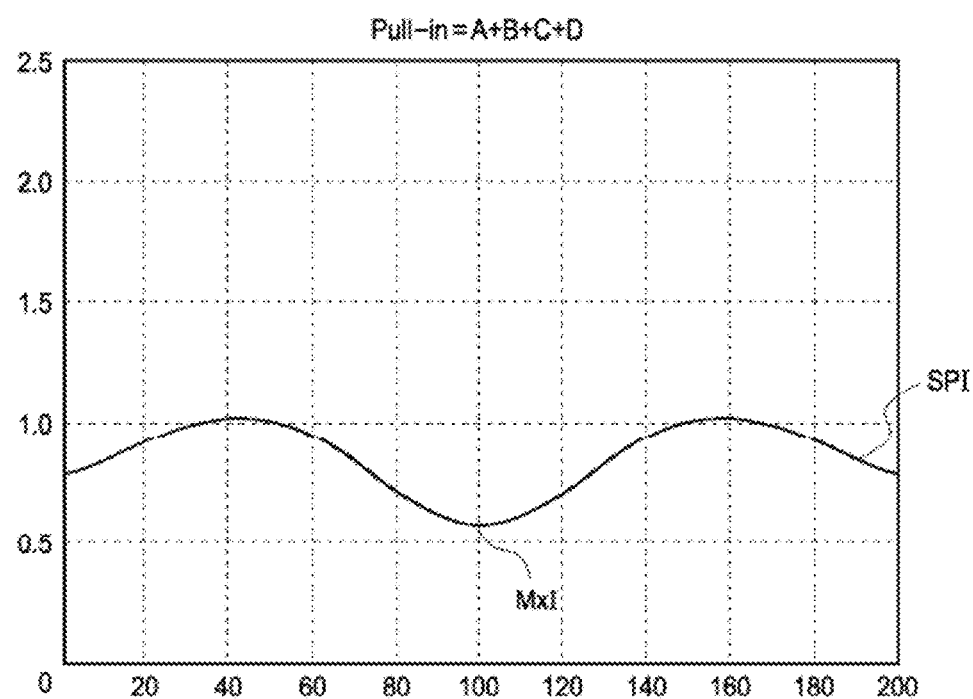
FIG. 13 is a graph illustrating the pull-in signal in the 0.31-µm de-track condition.

FIG. 13 illustrates the pull-in signal SPI generated when the objective lens OL is moved in the focusing direction in the de-track condition (0.31 μm). As seen from FIG. 13, the signal level of the pull-in signal SPI is reduced at an in-focus point with respect to the mark layer Y (near 100 in the horizontal axis), which corresponds to the maximum point MxI, as compared with that at a defocus point, i.e., at an out-of-focus point.

When the read light beam LR is defocused from the mark layer Y, the read light beam LR is irradiated in such a condition that the beam has a relatively large diameter and is de-tracked from the target track TG. Therefore, the read light beam LR is irradiated at its peripheral portion to the record mark RM, and the return light beam LRr is received in a certain light quantity.

On the other hand, when the read light beam LR is in focus with respect to the target mark layer YG, the read light beam LR is irradiated in such a condition that the beam has a relatively small diameter and is de-tracked from the target track TG. Therefore, the read light beam LR is hardly irradiated to the record mark RM, and the light quantity of the return light beam LRr is reduced from that resulting when the read light beam LR is defocused from the target mark layer YG.

Figure 14A:
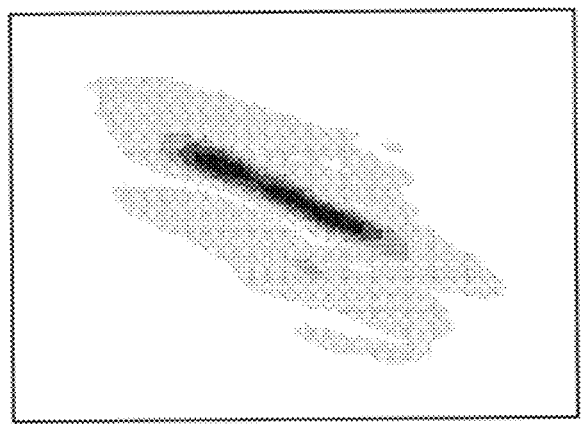
FIGS. 14A, 14B and 14C illustrate states of the return light spot in the 0.31-µm de-track condition.
Figure 14B:
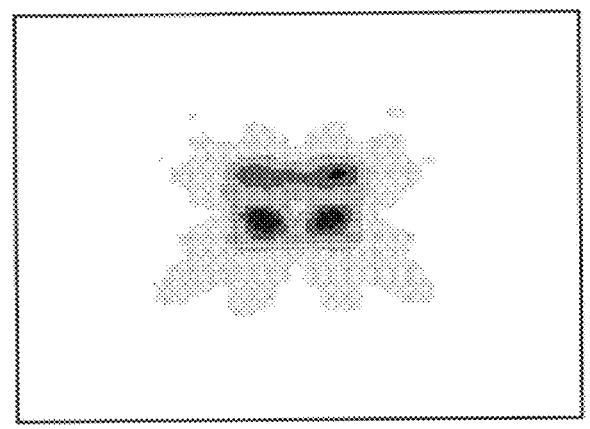
Figure 14C:
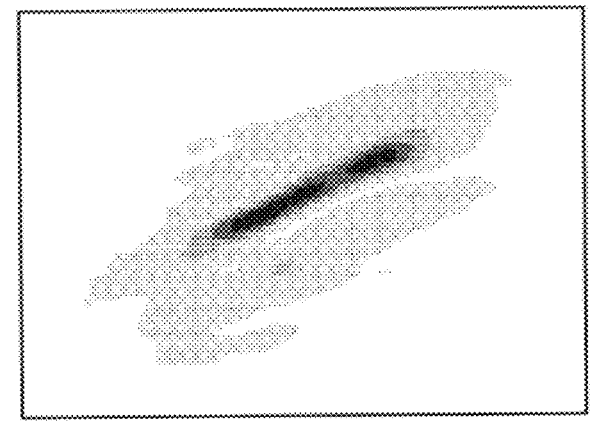

FIGS. 14A to 14C each illustrate a light intensity distribution in the return light spot Q that is received by the photodetector FD in the de-track condition (0.31 μm). In more detail, FIGS. 14A and 14C illustrate the return light spots Q when the focus error signal SFE (FIG. 12) is at the maximum point MxF and the minimum point MnF, respectively. FIG. 14B illustrates the return light spot Q when the read light beam LR is in focus with respect to the mark layer Y.

As seen from FIGS. 14A to 14C, the shape of the return light spot Q is deformed in such a way as spreading outwards to a larger extent than that in the on-track condition (FIG. 6B).

Figure 15A:
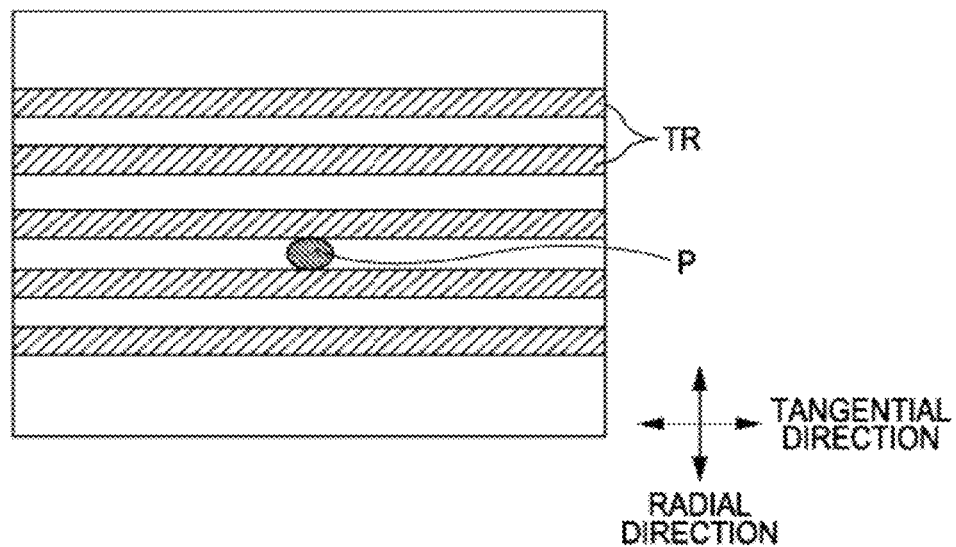
FIGS. 15A and 15B illustrate states of the spot and the record mark in the 0.55-µm de-track condition.
Figure 15B:
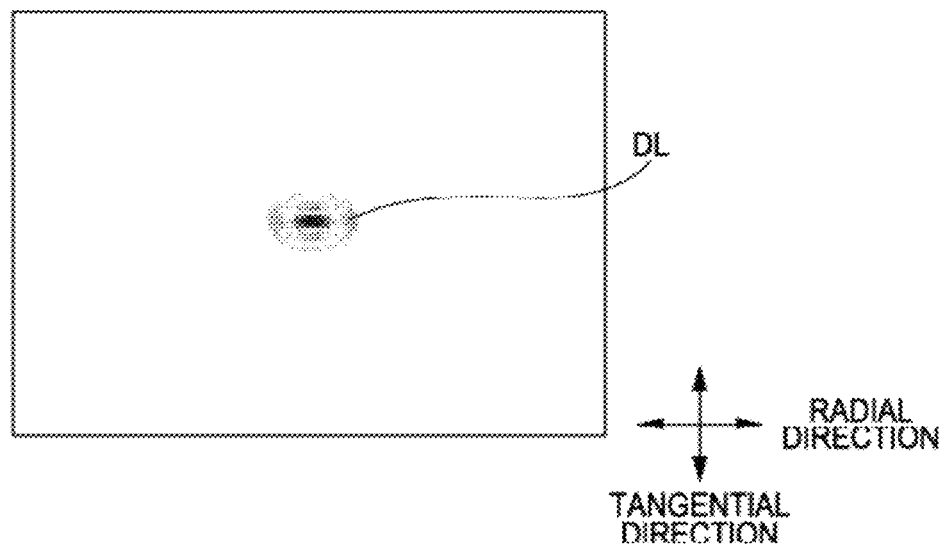

FIG. 15B illustrates the on-pupil light intensity distribution DL when the center of the spot P of the read light beam LR is de-tracked about 0.55 μm from the center of the track TR as illustrated in FIG. 15A. Because the track pitch TP is 1.1 μm, the center of the spot P is de-tracked by a ½ track in FIG. 15A.

As seen from FIG. 15B, the return light beam LRr has somewhat high light intensity in its central portion, but has very low light intensity in other portions than the central portion. Hence, the light quantity of the return light beam LRr is very small in total.

Figure 16:
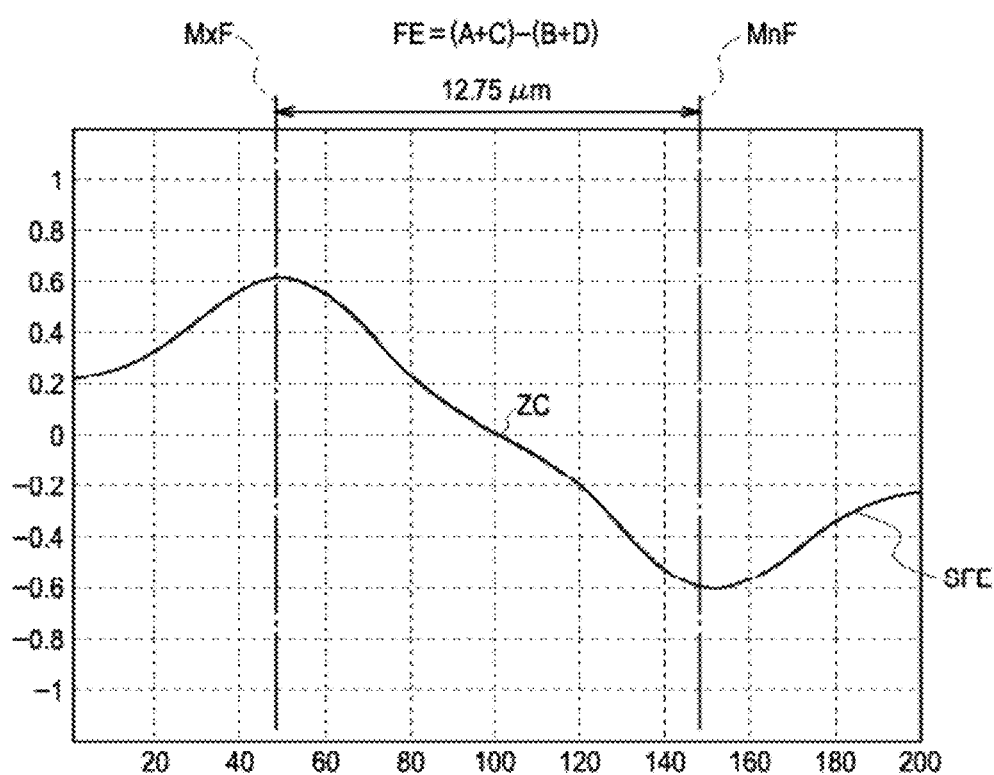
FIG. 16 is a graph illustrating the focus error signal in the 0.55-µm de-track condition.

FIG. 16 illustrates the focus error signal SFE generated when the objective lens OL is moved in the focusing direction in the de-track condition (0.55 μm). As seen from FIG. 16, the interval between the maximum point MxF and the minimum point MnF of the focus error signal SFE is further increased to about 12.75 μm and sensitivity of the focus error signal SFE is further reduced than those in the de-track condition (0.31 μm, FIG. 12).

Figure 17:
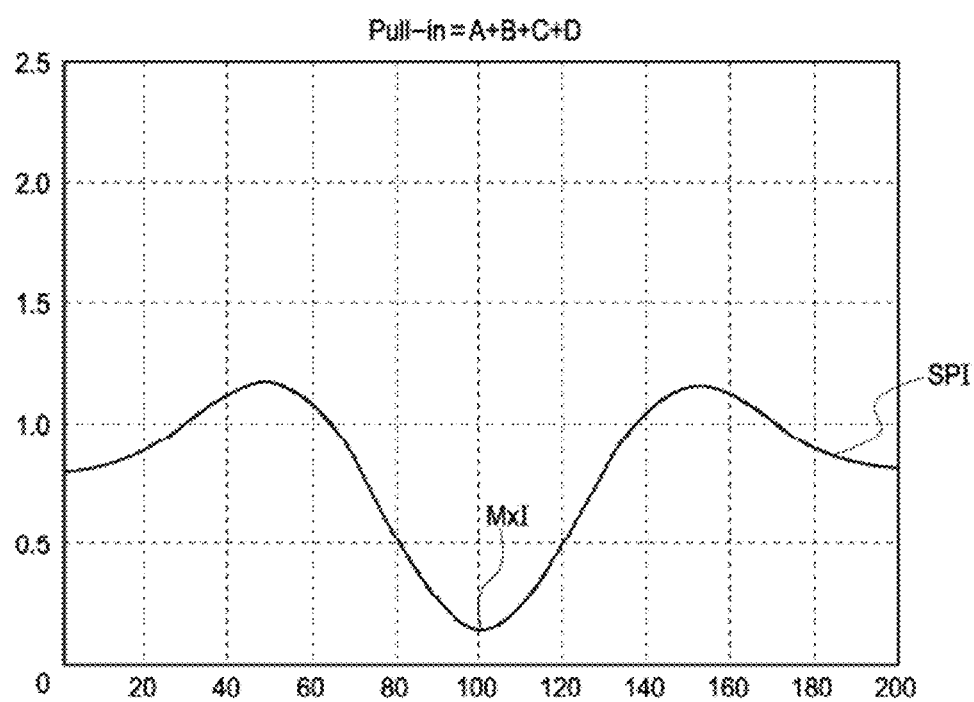
FIG. 17 is a graph illustrating the pull-in signal in the 0.55-µm de-track condition.

FIG. 17 illustrates the pull-in signal SPI generated when the objective lens OL is moved in the focusing direction in the de-track condition (0.55 μm). As seen from FIG. 17, the signal level of the pull-in signal SPI is further reduced at an in-focus point with respect to the mark layer Y (near 100 in the horizontal axis), which corresponds to the maximum point MxI, as compared with that in the de-track condition (0.31 μm, FIG. 13).

Figure 18A:
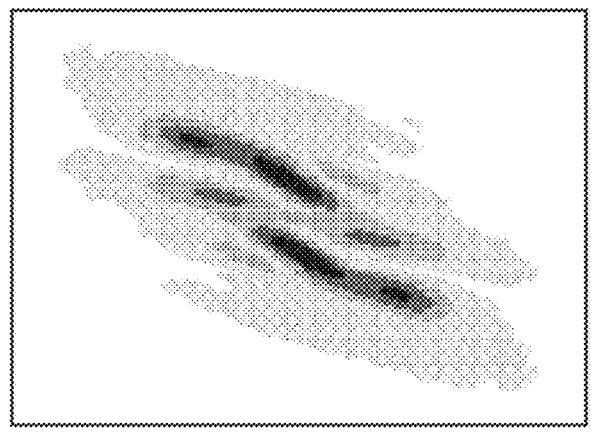
FIGS. 18A, 18B and 18C illustrate states of the return light spot in the 0.55-µm de-track condition.
Figure 18B:
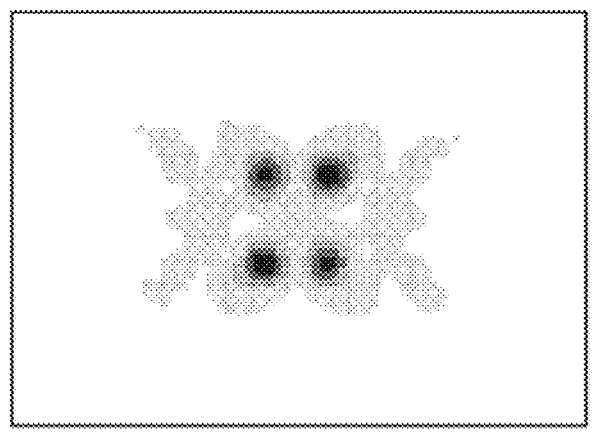
Figure 18C:
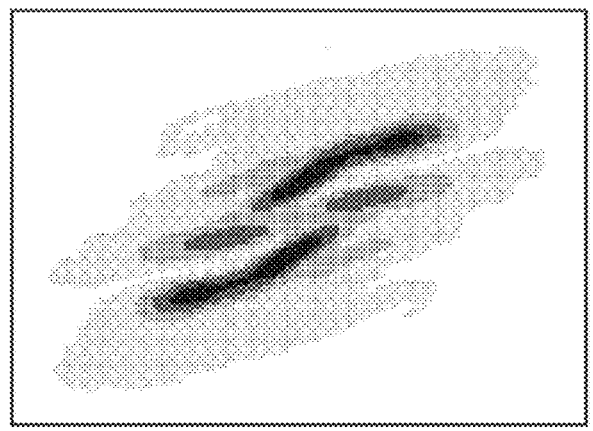

FIGS. 18A to 18C each illustrate a light intensity distribution in the return light spot Q that is received by the photodetector FD in the de-track condition (0.55 μm). In more detail, FIGS. 18A and 18C illustrate the return light spots Q when the focus error signal SFE (FIG. 16) is at the maximum point MxF and the minimum point MnF, respectively. FIG. 18B illustrates the return light spot Q when the read light beam LR is in focus with respect to the mark layer Y.

As seen from FIGS. 18A to 18C, the shape of the return light spot Q is further deformed in such a way as spreading outwards to a larger extent than that in the de-track condition (0.31 μm, FIG. 14).

Figure 19A:
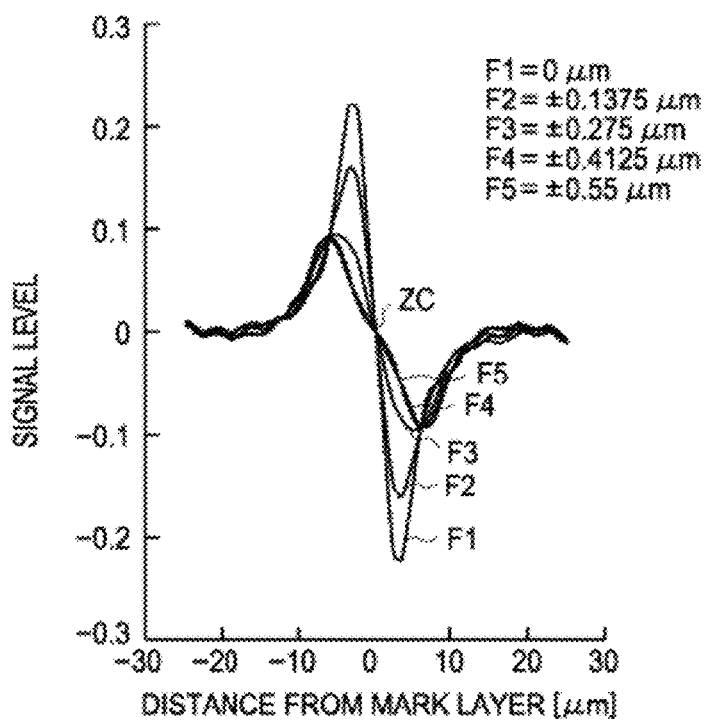
FIGS. 19A and 19B are graphs comparatively illustrating the focus error signal and a corrected focus error signal.
Figure 20A:
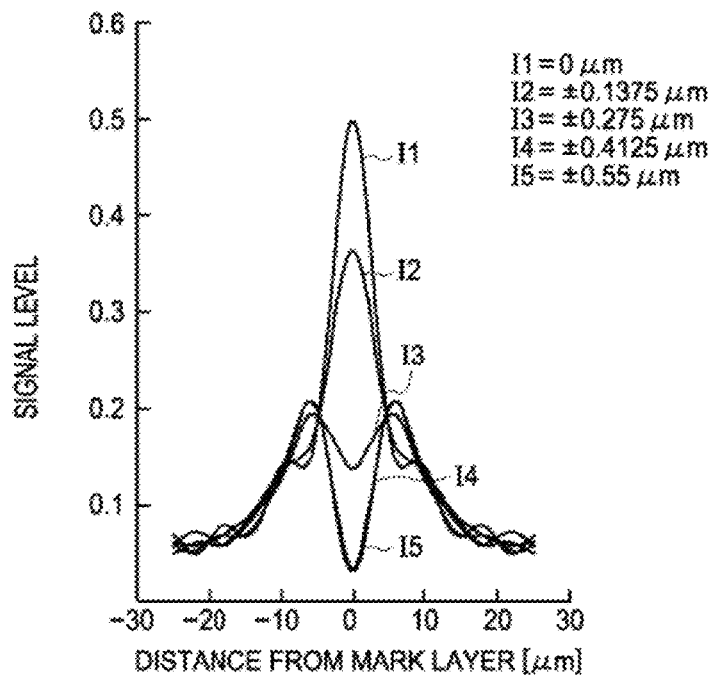
FIGS. 20A and 20B are graphs comparatively illustrating the pull-in signal and a corrected pull-in signal.

FIGS. 19A and 20A illustrate respectively the focus error signal SFE and the pull-in signal SPI which are generated when the center of the spot P of the read light beam LR is gradually de-tracked in units of 0.1375 μm from the on-track condition.

As illustrated in FIG. 19A, the focus error signal SFE has a very large difference in magnitude between the on-track condition indicated by a curve F1 and the de-track condition (0.55 μm) indicated by a curve F5. Also, a variation in slope of the focus error signal SFE is very large near the zero-crossing point ZC corresponding to the in-focus state.

Stated another way, the focus error signal SFE shows different signal levels between the on-track condition and the de-track condition.

Further, as illustrated in FIG. 20A, the pull-in signal SPI has a very large difference in magnitude between the on-track condition indicated by a curve I1 and the de-track condition (0.55 μm) indicated by a curve I5. The pull-in signal SFI takes quite different signal levels particularly near the in-focus state.

In general, the optical disc 100 has eccentricity of about 50 μm at maximum. Accordingly, assuming that the track pitch TP is about 1.1 μm, when the read light beam LR is irradiated to the same position, the read light beam LR intersects the track TR about 90 times per rotation of the optical disc 100.

Figure 22A:
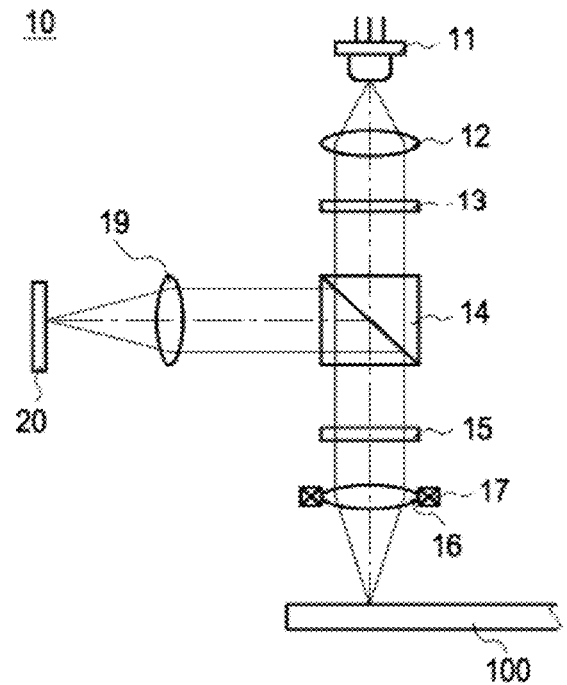
FIGS. 22A and 22B illustrate constructions of an optical pickup and a photodetector.

In a focus pull-in process in which focus control is started with respect to the desired mark layer Y, for example, the optical disc apparatus 1 irradiates the read light beam LR without moving an objective lens 16 (FIG. 22A). As a result, the read light beam LR repeatedly comes into the on-track condition and the de-track condition at a certain cycle, thus generating the comb-like pull-in signal SPI and the focus error signal SFE having a greatly deformed waveform, which are illustrated in FIG. 2.

As described above, in the optical disc 100 in which the record mark RM is recorded in the uniform recording layer 101, since the optical disc 100 has no signal recording surface reflecting the read light beam LR, the light quantity of the return light beam LRr greatly varies depending on the on-track condition or the de-track condition. Therefore, the respective signal levels of the focus error signal SFE and the pull-in signal SPI, each representing the distance between the target mark layer YG and the focus of the read light beam LR, vary depending on the on-track condition or the de-track condition.

Consequently, in the process of irradiating the read light beam LR to the same position (i.e., the process in a pre-stage for starting the tracking control), when the read light beam LR intersects the track TR due to the eccentricity of the optical disc 100, the respective signal levels of the focus error signal SFE and the pull-in signal SPI vary to a large extent.

(1-3) Configuration of Optical Disc Apparatus

As illustrated in FIG. 21, the optical disc apparatus 1 primarily includes a control unit 2. The control unit 2 includes a CPU (Central Processing Unit) (not shown), a ROM (Read Only Memory) storing various programs, etc., and a RAM (Random Access Memory) serving as a work memory for the CPU.

When information is reproduced from the optical disc 100, the control unit 2 drives a spindle motor 5 for rotation through a drive control unit 3, whereby the optical disc 100 placed on a predetermined turntable is rotated at a desired speed.

In accordance with address information for reproducing which is supplied from an external device (not shown), the control unit 2 drives a thread motor 6 through the drive control unit 3 such that an optical pickup 10 is moved over a large distance along movement shafts 6A and 6B in the tracking direction, i.e., in a direction toward the inner peripheral side or the outer peripheral side of the optical disc 100.

The optical pickup 10 includes a plurality of optical parts, such as the objective lens 16. Under control of the control unit 2, the optical pickup 10 irradiates the read light beam LR to the track TR (hereinafter referred to as the "target track TG") in the mark layer Y (hereinafter referred to as the "target mark layer YG") within the optical disc 100, which is indicated by the address information for reproducing, thus detecting the return light beam LRr.

A signal processing unit 4 can reproduce information recorded as the record marks RM in the target track TG by executing predetermined processes, such as an arithmetic process, a demodulation process, and a decoding process, on a detection signal supplied from the optical pickup 10.

An actuator 17 (FIG. 22A) for the optical pickup 10 performs focus control and tracking control of the objective lens 16 in accordance with the focus error signal SFE and a tracking error signal STE, which are calculated from the detection signal, thus adjusting the focus position of the read light beam LR that is condensed through the objective lens 16.

(1-4) Construction of Optical Pickup

The construction of the optical pickup 10 will be described below. As illustrated in FIG. 22A, a laser diode 11 of the optical pickup 10 emits the read light beam LR as a blue laser beam with a wavelength of about 405 nm, which enters a collimator lens 12. Under control of the control unit 2 (see FIG. 21), the laser diode 11 emits the read light beam LR in predetermined light quantity corresponding to read of information. The collimator lens 12 converts the read light beam LR from divergent light to parallel light that enters a grating 13.

The grating 13 separates the read light beam LR into a main beam MB and two sub-beams SB, which enter as individual read light beams LR to a polarization beam splitter 14.

The polarization beam splitter 14 allows each read light beam LR to pass therethrough and to enter a ¼ wavelength plate 15 depending on the polarization direction of the incident light beam. The ¼ wavelength plate 15 converts each read light beam LR from P-polarized light to circularly polarized light that enters the objective lens 16.

The objective lens 16 condenses and irradiates the read light beam LR to the target track TG and the vicinity thereof in the recording layer 101 of the optical disc 100. At that time, the objective lens 16 condenses the main beam MB and the two sub-beams SB to separate focus points such that the main beam MB is irradiated to the target track TG and the two sub-beams SB are irradiated to the vicinity of the target track TG. As a result, a main spot MP and two sub-beam spot SP are formed respectively by the main beam MB and the two sub-beams SB at different locations in the target mark layer Y (as described in detail later).

When the record mark RM is formed in the target track TG and the vicinity thereof, the recording layer 101 generates the return light beam LRr. On the other hand, when the record mark RM is not formed in the target track TG and the vicinity thereof, the recording layer 101 causes most of the read light beam LR to pass therethrough and hardly generates the return light beam LRr.

The return light beam LRr propagates along an optical path of the original read light beam LR in the reversed direction. More specifically, the return light beam LRr is converted to parallel light through the objective lens 16 and further converted to S-polarized light through the ¼ wavelength plate 15. Thereafter, the S-polarized light enters the polarization beam splitter 14.

The polarization beam splitter 14 reflects the return light beam LRr in the form of S-polarized light at a reflective/transmissive surface 14S, thus causing the return light beam LRr to enter a multi-lens 19. The multi-lens 19 condenses the return light beam LRr to be irradiated to the photodetector 20 while adding astigmatism to the return light beam.

Because the read light beam LR is made up of the main beam MB and the two sub-beams SB, the return light beam LRr is generated as a main return light beam MBr and two sub-return light beams SBr.

Figure 22B:
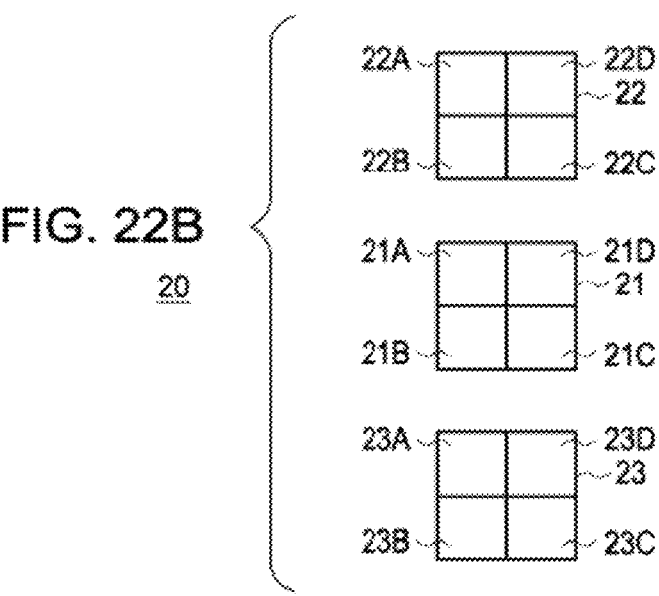

As illustrated in FIG. 22B, the photodetector 20 includes a main spot detector 21 for receiving the main return light beam MBr and sub-spot detectors 22 and 23 for receiving the sub-return light beams SBr.

The main spot detector 21 has detection areas 21A, 21B, 21C and 21D (hereinafter referred to together as "detection areas 21A to 21D") for receiving the main return light beam MBr.

The main spot detector 21 detects respective parts of the main return light beam MBr by the detection areas 21A to 21D and generates detection signals UMa, UMb, UMc and UMd (hereinafter referred to together as "detection signals UMa to UMd") depending on respective light quantities detected at that time. The detection signals UMa to UMd are sent to the signal processing unit 4 (FIG. 21).

The sub-spot detector 22 has detection areas 22A, 22B, 22C and 22D (hereinafter referred to together as "detection areas 22A to 22D") for receiving one sub-return light beam SBr.

The sub-spot detector 22 detects respective parts of the one sub-return light beam SBr by the detection areas 22A to 22D and generates detection signals US1$a$, US1$b$, US1$c$ and US1$d$ (hereinafter referred to together as "detection signals US1$a$ to US1$d$") depending on respective light quantities detected at that time. The detection signals US1$a$ to US1$d$ are sent to the signal processing unit 4 (FIG. 21).

As with the sub-spot detector 22, the sub-spot detector 23 has detection areas 23A, 23B, 23C and 23D (hereinafter referred to together as "detection areas 23A to 23D") for receiving the other sub-return light beam SBr.

The sub-spot detector 23 detects respective parts of the other sub-return light beam SBr by the detection areas 23A to 23D and generates detection signals US2a, US2b, US2c and US2d (hereinafter referred to together as "detection signals US2a to US2d") depending on respective light quantities detected at that time. The detection signals US2a to US2d are sent to the signal processing unit 4 (FIG. 21).

(1-5) Generation of Servo Control Signal

As described above, the optical pickup 10 (FIG. 22A) of the optical disc apparatus 1 separates the read light beam LR into the main beam MB and the two sub-beams SB and irradiates those beams to the optical disc 100.

At that time, the grating 13 in the optical pickup 10 is arranged such that the main spot MP formed by the main beam MB and the sub-spots SP formed by the two sub-beams SB are irradiated as the read light beams LR to the optical disc 100 in a state spaced from one another at intervals of ½ of the track pitch TP in the radial direction. Each of the sub-spots SP has substantially the same diameter as that of the main spot MP.

Figure 23A:
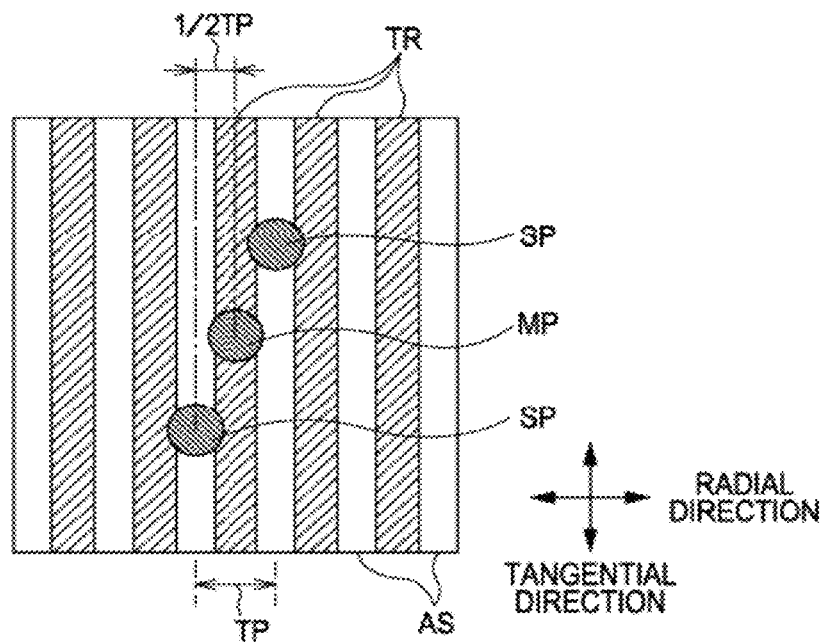
FIGS. 23A and 23B illustrate irradiation of light beams in a first embodiment.
Figure 23B:
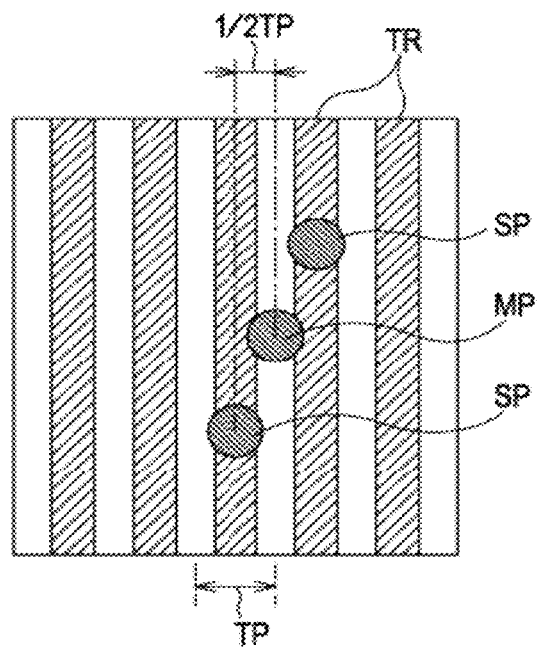

Accordingly, as illustrated in FIG. 23A, when the sub-spots SP are not positioned on the track TR, the main spot MP is positioned on the track TR. On the other hand, as illustrated in FIG. 23B, when the main spot SP is not positioned on the track TR, the sub-spots SP are positioned on the track TR.

Thus, the optical disc apparatus 1 ensures that at least one of the main beam MB and the sub-beam SB can be positively irradiated to the track TR.

In the optical disc apparatus 1 according to this embodiment, therefore, a corrected focus error signal SFEc and a corrected pull-in signal SPIc are generated based on the main return light beam MBr formed by the main beam MB and the sub-return light beams SPr formed by the sub-beams SB.

More specifically, when the detection signals UMa to UMd, US1a to US1d, and US2a to US2d are supplied from the photodetector 20, the signal processing unit 4 (FIG. 21) of the optical disc apparatus 1 generates the corrected focus error signal SFE in accordance with the following formula (3):

$$SFEc=(UMa+UMc)-(UMb+UMd)+k\{(US1a+US1c)-(US1b+US1d)+(US2a+US2c)-(US2b+US2d)\} \quad (3)$$

In the formula (3), k is a coefficient for correcting the difference in light quantity between the main beam MB and the sub-beams SB. The coefficient k is set to such a value that respective signal levels of the detection signals US1a to US1d and the detection signals US2a to US2d resulting from the two sub-beams SB are each about ½ of a signal level of the detection signals UMa to UMd resulting from the main beam MB. For example, k=about 5 is set when the two sub-beams SB are irradiated in light quantity being about 1/10 of the light quantity of the main beam MB.

Figure 19B:
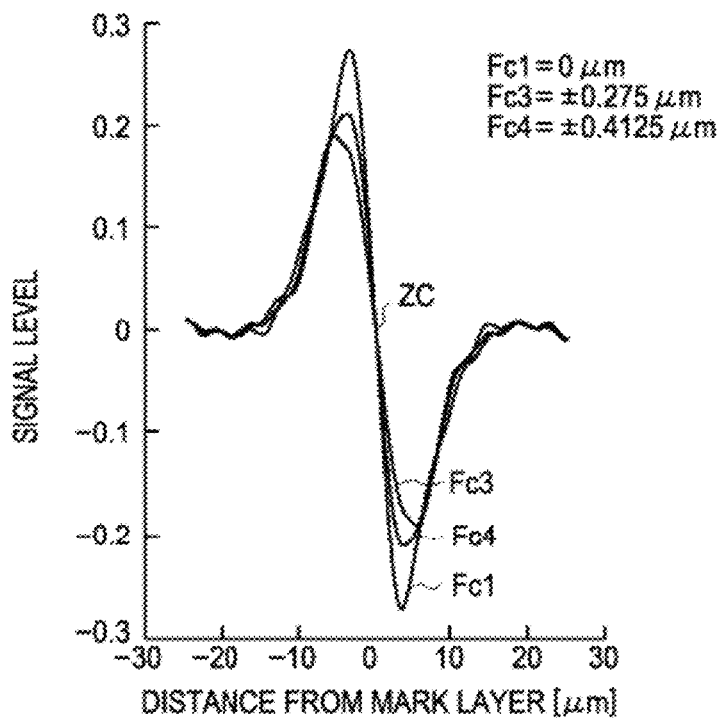

FIG. 19B illustrates the corrected focus error signal SFEc with respect to the distance from the mark layer Y when the main beam MB is de-tracked 0.275 μm and 0.4125 μm, in addition to the on-track condition where the center of the main beam MB is irradiated to the center of the track TR.

As seen from FIG. 19B, comparing the states where the main beam MB is in the on-track condition (curve Fc1) and the de-track condition (curves Fc3 and Fc4), the difference in signal level between the maximum point MxF and the minimum point MnF and the difference in slope of the curve near the zero-crossing point ZC are smaller in the corrected focus error signal SFEc than in the focus error signal SFE (FIG. 19A).

Additionally, a change in signal level of the corrected focus error signal SFEc is maximum at the curve Fc3 relative to the curve Fc1, i.e., when the main beam MB and the sub-beams SB are both de-tracked ¼ (0.275 μm) of the track pitch TP.

In other words, the corrected focus error signal SFEc shows a signal level corresponding to the distance from the mark layer Y, and the signal level of the corrected focus error signal SFEc hardly varies depending on the position of the main beam MB relative to the track TR.

As a result, in the optical disc apparatus 1, when the objective lens 16 is moved in the focusing direction while its position in the radial direction is held fixed, the corrected focus error signal SFEc can be generated in waveform improved from that of the ordinary (uncorrected) focus error signal SFE, as illustrated in FIG. 24B.

Further, the signal processing unit 4 generates the corrected pull-in signal SPIc in accordance with the following formula (4):

$$SPIc=(UMa+UMb+UMc+UMd)+k\{(US1a+US1b+US1c+US1d)+(US2a+US2b+US2c+US2d)\} \quad (4)$$

Figure 20B:
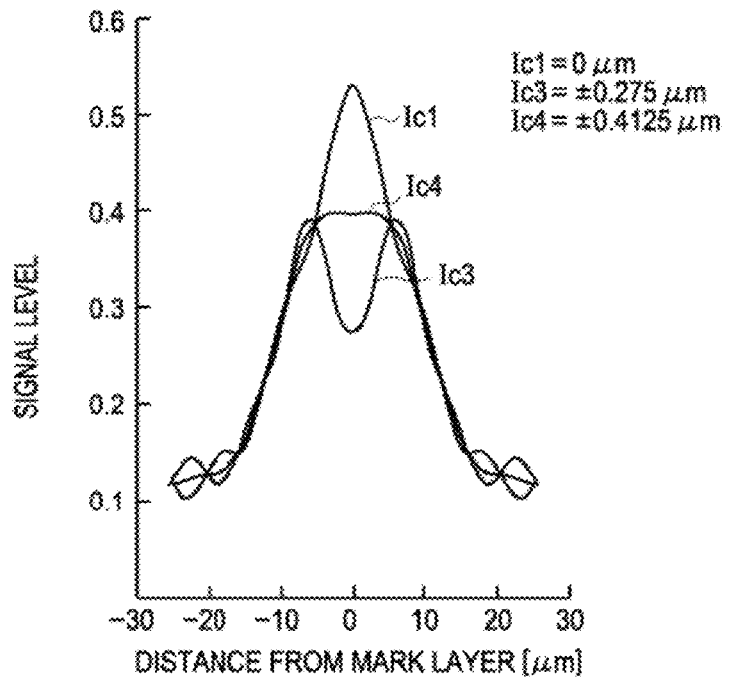

FIG. 20B illustrates the corrected pull-in signal SPIc with respect to the distance from the mark layer Y when the main beam MB is de-tracked 0.275 μm and 0.4125 μm, in addition to the on-track condition where the center of the main beam MB is irradiated to the center of the track TR.

As seen from FIG. 20B, comparing the states where the main beam MB is in the on-track condition (curve Ic1) and the de-track condition (curves Ic3 and Ic4), the difference in signal level at the maximum point MxF is reduced in the corrected pull-in signal SPIc to a larger extent than in the pull-in signal SFI (FIG. 20A).

Additionally, a change in signal level of the corrected pull-in signal SPIc is maximum at the curve Ic3 relative to the curve Ic1, i.e., when the main beam MB and the sub-beams SB are both de-tracked ¼ (0.275 μm) of the track pitch TP.

In other words, the corrected pull-in signal SPIc shows a signal level corresponding to the distance from the mark layer Y, and has a smaller variation in the signal level of the corrected pull-in signal SPIc depending on the position of the main beam MB relative to the track TR than in the signal level of the pull-in signal SPI.

As a result, in the optical disc apparatus 1, when the objective lens 16 is moved in the focusing direction while its position in the radial direction is held fixed, the corrected pull-in signal SPIc can be generated, as illustrated in FIG. 25B, in waveform improved from that of the ordinary (uncorrected) pull-in signal SPI (FIG. 25A).

Thus, the optical disc apparatus 1 can generate, based on the return light beam LRr resulting from the irradiation to the track TR, the corrected focus error signal SFEc and the corrected pull-in signal SPIc, each of which has a signal level corresponding to the distance from the mark layer Y.

Further, the signal processing unit 4 (FIG. 21) of the optical disc apparatus 1 generates a main pull-in signal SPIm in accordance with the following formula (5). The main pull-in signal SPIm is generated based on the main beam MB and hence corresponds to the pull-in signal SPI that is generated in the related-art optical disc apparatus.

$$SPIm=(UMa+UMb+UMc+UMd) \quad (5)$$

Moreover, the signal processing unit 4 generates a tracking error signal STE in accordance with the following formula (6). In the optical disc apparatus 1, because the sub-spots SP and the main spot MP are spaced from one another by ½ of the track pitch TP in the radial direction, the tracking error signal STE is generated in accordance with the DPP (Differential Push-Pull) method.

$$STE = (UMa+UMb)-(UMc+UMd)+k\{(US1a+US1b)-(US1c+US1d)+(US2a+US2b)-(US2c+US2d)\} \quad (6)$$

Still further, the signal processing unit 4 generates a reproduced signal SRF in accordance with the following formula (7):

$$SRF = UMa+UMb+UMc+UMd \quad (7)$$

As described above, in the optical disc apparatus 1, the sub-beam SB is irradiated to an area where the main beam MB is not irradiated in the radial direction, thus ensuring that at least one of the main beam MB and the sub-beam SB is irradiated to the track TR. Further, in the optical disc apparatus 1, the respective detection signals of the main beam MB and the sub-beam SB are added to each other, whereby the corrected focus error signal SFEc and the corrected pull-in signal SPIc, each having smaller variations in signal levels depending on the position of the read light beam LR relative to the track TR, can be generated based on the return light beam LRr resulting from the irradiation to the track TR.

As a result, the optical disc apparatus 1 can generate the corrected focus error signal SFEc and the corrected pull-in signal SPIc as signals representing the distance from the focus of the read light beam LR to the mark layer Y.

(1-6) Configuration of Servo Processing Unit

As illustrated in FIG. 26, a servo processing unit 30 in the drive control unit 3 controls the entire optical disc apparatus 1 through a servo control unit 31. Though described in detail later, the servo control unit 31 executes a number-of-layers counting process, a focus pull-in process, and a tracking pull-in process based on the corrected focus error signal SFEc, the corrected pull-in signal SPIc, the main pull-in signal SPIm, and the tracking error signal STE, which are supplied from the signal processing unit 4.

Also, the servo processing unit 30 generates, based on the corrected pull-in signal SPIc, the corrected focus error signal SFEc, and the tracking error signal STE, a focus drive current DFE and a tracking drive current DTE, which are supplied to the actuator 17.

More specifically, the servo processing unit 30 includes a focus loop circuit including an FE gain adjusting unit 32, a phase compensating unit 34, and a switch 35, and a tracking loop circuit including a TE gain adjusting unit 32, a phase compensating unit 44, and a switch 45.

When the corrected focus error signal SFEc is supplied to the FE gain adjusting unit 32, the FE gain adjusting unit 32 multiplies the corrected focus error signal SFEc by a reference gain that is stored in advance, and supplies the resulting product as the focus drive current DFE to the phase compensating unit 34. The phase compensating unit 34 adjusts the phase of the focus drive current DFE so as to stabilize a focus control system, and supplies the adjusted focus drive current DFE to the switch 35.

The switch 35 is selectively turned "ON" and "OFF" in response to a switching signal SSF supplied from the servo control unit 31. The servo control unit 31 turns "ON" a focus loop circuit by turning "ON" the switch 35. As a result, the focus drive current DFE is supplied to the actuator 17, thus starting the focus control with feedback control.

Similarly, when the tracking error signal SFE is supplied to the TE gain adjusting unit 42, the TE gain adjusting unit 42 multiplies the tracking error signal STE by a reference gain that is stored in advance, and supplies the resulting product as the tracking drive current DTE to the phase compensating unit 44. The phase compensating unit 44 adjusts the phase of the tracking drive current DTE so as to stabilize a tracking control system, and supplies the adjusted tracking drive current DTE to the switch 45.

The switch 45 is selectively turned "ON" and "OFF" in response to a switching signal SST supplied from the servo control unit 31. The servo control unit 31 turns "ON" a tracking loop circuit by turning "ON" the switch 45. As a result, the tracking drive current DTE is supplied to the actuator 17, thus starting the tracking control with feedback control.

A focus AGC (Auto Gain Control) circuit and a tracking AGC circuit are provided by respectively attaching, to the focus loop circuit and the tracking loop circuit, switches 33 and 43 for controlling supply of the corrected pull-in signal SPIc.

More specifically, the focus AGC circuit is formed such that, when the switch 33 is turned from "OFF" to "ON", the focus AGC circuit is changed over from "OFF" to "ON". At that time, the corrected pull-in signal SPIc is supplied to the FE gain adjusting unit 32 through the switch 33, and a reference level signal SNF is supplied to the FE gain adjusting unit 32 from the servo control unit 31.

The FE gain adjusting unit 32 divides the corrected pull-in signal SPIc by the reference level signal SNF for normalization, and multiplies a normalized value by the reference gain, thus calculating a setting gain. Further, the FE gain adjusting unit 32 multiplies the corrected focus error signal SFEc by the setting gain, thus executing an AGC process to automatically adjust the gain depending on the light quantity of the return light beam LRr.

Similarly, the tracking AGC circuit is formed such that, when the switch 43 is turned from "OFF" to "ON", the tracking AGC circuit is changed over from "OFF" to "ON". At that time, the corrected pull-in signal SPIc is supplied to the TE gain adjusting unit 42 through the switch 43, and a reference level signal SNT is supplied to the TE gain adjusting unit 42 from the servo control unit 31.

The TE gain adjusting unit 42 divides the corrected pull-in signal SPIc by the reference level signal SNT for normalizing the former, and multiplies a normalized pull-in value by the reference gain, thus calculating a setting gain. Further, the TE gain adjusting unit 42 multiplies the tracking error signal STE by the setting gain, thus executing an AGC process.

As described above, the servo processing unit 30 includes the focus loop circuit, the tracking loop circuit, the focus AGC circuit, and the tracking AGC circuit, which are selectively turned "ON" and "OFF" upon the switches 35, 45, 33 and 43 being changed over under control of the servo control unit 31.

(1-7) Number-of-Layers Counting Process

The optical disc apparatus 1 first executes the number-of-layers counting process for counting the number of mark layers Y which are present in the recording layer 101 of the optical disc 100.

More specifically, when a request for reproducing information recorded on the optical disc 100 is applied from the external device, for example, the control unit 2 (FIG. 21) of the optical disc apparatus 1 starts the number-of-layers counting process. The control unit 2 rotates the optical disc 100 and drives the actuator 17. With the driving of the actuator 17, the objective lens 16 is displaced to a position (hereinafter referred to as a "remotest position") that is maximally away from the optical disc 100, and is then moved to approach the optical disc 100 at a predetermined moving speed (these operations will be referred to as a "search operation" hereinafter). Note that the actuator 17 is operated to be displaced to a position corresponding to both the focus drive current DFE and the tracking drive current DTE which are supplied from the drive control unit 3.

During the search operation, the signal processing unit 4 (FIG. 21) of the optical disc apparatus 1 generates the corrected focus error signal SFEc and the corrected pull-in signal SPIc from the detection signals UMa to UMd, US1a to US1d, and US2a to US2d, and supplies the generated signals to the servo processing unit 30 in the drive control unit 3.

At a time point t1 illustrated in FIG. 27, when the corrected pull-in signal SPIc becomes equal to or higher than a focus-in threshold AFI, the servo control unit 31 in the servo processing unit 30, illustrated in FIG. 26, raises a corrected focus-in signal SFIc from a "Low" level to a "High" level and starts monitoring of the corrected focus error signal SFEc.

At a time point t2, when the zero-crossing point ZC at which the corrected focus error signal SFEc intersects a reference level SL is detected, the servo control unit 31 raises a zero-crossing point detection signal SZCf from a "Low" level to a "High" level and also raises a count signal SCT from a "Low" level to a "High" level.

At a time point t3, when the corrected pull-in signal SPIc becomes lower than the focus-in threshold AFI, the servo control unit 31 causes each of the corrected focus-in signal SFIc, the zero-crossing detection signal SZCf, and the count signal SCT to fall from the "High" level to the "Low" level, and continues the monitoring of the corrected pull-in signal SPIc.

In each of periods from a time point t4 to t6, from a time point t7 to t9, and from a time point t10 to t12, the control unit 2 repeats processing similar to that executed in the period from the time point t1 to t3. As a result, the servo control unit 31 raises the count signal SCT to the "High" level four times in total. The servo control unit 31 supplies the four count signals SCT to the control unit 2.

At a time point t13, when the objective lens 16 is displaced to an end-of-detection position with the supply of the predetermined focus drive current DFE to the actuator 17, the servo control unit 31 causes the objective lens 16 to displace in the direction away from the optical disc 100. The control unit 2 counts, as a count value N, the number of times at which the count signal STC has risen to the "High" level, and recognizes the count value N as the number of mark layers Y which are present in the recording layer 101.

In the optical disc apparatus 1, as described above, the number of mark layers Y can be counted by generating the corrected pull-in signal SPIc that represents the light quantity of the return light beam LRr resulting from the entirety of each mark layer Y, and by properly detecting the zero-crossing point ZC from the corrected focus error signal SFEc.

(1-8) Focus Pull-in Process

Further, the optical disc apparatus 1 executes the focus pull-in process for starting the focus control with respect to the target mark layer YG which is indicated by the address information for reproducing.

More specifically, subsequent to the number-of-layers counting process, the control unit 2 (FIG. 21) of the optical disc apparatus 1 causes the objective lens 16 to be displaced to the remotest position and then moved so as to approach the optical disc 100 at the predetermined moving speed while the optical disc 100 is continuously rotated.

During the search operation, the signal processing unit 4 (FIG. 21) of the optical disc apparatus 1 generates the corrected focus error signal SFEc, the corrected pull-in signal SPIc, and the main pull-in signal SPIm from the detection signals UMa to UMd, US1a to US1d, and US2a to US2d, and supplies the generated signals to the servo processing unit 30 in the drive control unit 3.

As illustrated in FIG. 28, for example, when the corrected pull-in signal SPIc becomes equal to or higher than the focus-in threshold AFI at a time point t21, the servo control unit 31 in the servo processing unit 30 raises the corrected focus-in signal SFIc from a "Low" level to a "High" level and starts the monitoring of the corrected focus error signal SFEc.

Also, the servo control unit 31 monitors the main pull-in signal SPIm and generates an on-track signal SOT that rises to a "High" level only when the main pull-in signal SPIm becomes equal to or higher than the focus-in threshold AFI.

At a time point t22, when the zero-crossing point ZC is detected from the corrected focus error signal SFEc, the servo control unit 31 raises the zero-crossing point detection signal SZCf from a "Low" level to a "High" level and also raises a focus servo control signal SFB from a "Low" level to a "High" level. The focus servo control signal SFB is a signal that is raised to the "High" level during execution of the focus control.

With the rise of the focus servo control signal SFB being a trigger, the servo control unit 31 turns "ON" the focus loop circuit. The optical disc apparatus 1 executes the focus control based on the corrected focus error signal SFEc with feedback control such that the corrected focus error signal SFEc becomes zero, i.e., such that the read light beam LR (including the main beam MB and the sub-beams SB) is focused to the target mark layer YG.

At a time point t23, when the corrected pull-in signal SPIc becomes lower than the focus-in threshold AFI, the servo control unit 31 causes each of the corrected focus-in signal SFIc and the zero-crossing point detection signal SZCf to fall from the "High" level to the "Low" level.

The servo control unit 31 measures a time lapsed from the time point t23 and confirms the level of the corrected focus-in signal SFIc at a time point t24 after the lapse of a predetermined focus confirmation time from the time point t22. When the corrected focus-in signal SFIc is at the "Low" level, the servo control unit 31 recognizes that the focus control system is in a divergent state and the focus control is not properly executed. Upon such recognition, the servo control unit 31 causes the focus servo control signal SFB to fall to the "Low" level. At the same time, with the fall of the focus servo control signal SFB being a trigger, the servo control unit 31 turns "OFF" the focus loop circuit again.

Further, the control unit 2 causes the objective lens 16 to be displaced again to the remotest position and then moved so as to approach the optical disc 100 at the predetermined moving speed.

At a time point t25, when the corrected pull-in signal SPIc becomes equal to or higher than the focus-in threshold AFI, the servo control unit 31 raises the corrected focus-in signal SFIc from a "Low" level to a "High" level and starts the monitoring of the corrected focus error signal SFEc.

At a time point t26, when the zero-crossing point ZC is detected from the corrected focus error signal SFEc, the servo control unit 31 raises the zero-crossing point detection signal SZCf from a "Low" level to a "High" level and also raises the focus servo control signal SFB from a "Low" level to a "High" level.

At a time point t27 after the lapse of the predetermined focus confirmation time from the time point t26, the servo control unit 31 confirms the level of the corrected focus-in signal SFIc. When the corrected focus-in signal SFIc is at the "High" level, the servo control unit 31 recognizes that the focus control system is in a convergent state and the focus control is properly executed. Upon such recognition, the servo control unit 31 causes the zero-crossing point detection signal SZCf to fall to the "Low" level.

In that case, the servo control unit 31 subsequently starts an AGC process for adjusting the gain of the corrected focus error signal SFEc.

More specifically, when the servo control unit 31 (FIG. 26) in the servo processing unit 30 of the optical disc apparatus 1 starts the AGC control for the corrected focus error signal SFEc, the switching signal SSF is supplied to the switch 33, thus turning the switch 33 from "OFF" to "ON". Correspondingly, the corrected pull-in signal SPIc is supplied to the FE gain adjusting unit 32.

The FE gain adjusting unit 32 divides the corrected pull-in signal SPIc by the reference level signal SNF, which is supplied from the servo control unit 31, for normalizing the corrected pull-in signal SPIc, to thereby calculate a normalized pull-in value. Then, the FE gain adjusting unit 32 multiplies the normalized pull-in value by the reference gain value that is set in advance, thus determining a setting gain value. Further, the FE gain adjusting unit 32 multiplies the corrected focus error signal SFEc supplied thereto by the setting gain value, thus generating the focus drive current DFE that is supplied to the phase compensating unit 34.

For the purpose of improving stability of the control system, the phase compensating unit 34 adjusts the phase of the focus drive current DFE and outputs the adjusted focus drive current DFE through the switch 35. As a result, the actuator 17 is supplied with the focus drive current DFE generated based on the corrected focus error signal SFEc of which gain has been adjusted through the AGC process.

Thus, since the servo control unit 31 can determine the setting gain value based on the light quantity of the return light beam LRr from the mark layer Y, the proper focus drive current DFE can be supplied to the actuator 17 and the focus control system can be stabilized.

In the optical disc apparatus 1, as described above, the focus control can be started by generating the corrected pull-in signal SPIc that represents the light quantity of the return light beam LRr resulting from the entirety of the mark layer Y, and by properly detecting the zero-crossing point ZC from the corrected focus error signal SFEc. Further, in the optical disc apparatus 1, whether the focus control is stably executed or not can be properly determined by checking whether the corrected focus error signal SFEc exceeds the focus-in threshold AFI.

Further, in the optical disc apparatus 1, since the corrected focus error signal SFEc is generated based on the return light beam LRr resulting from the entirety of the mark layer Y, the corrected focus error signal SFEc can represent the distance between the mark layer Y and the focus of the read light beam LR regardless of the positional relationship between the read light beam LR and the track TR. As a result, the focus control system can be stabilized.

Still further, in the optical disc apparatus 1, the setting gain value of the corrected focus error signal SFEc is adjusted based on the corrected pull-in signal SPIc that represents the light quantity of the return light beam LRr resulting from the entirety of the mark layer Y. Therefore, the servo processing unit 30 can set the proper setting gain value depending on the light quantity of the return light beam LRr. As a result, the focus control system can be stabilized.

(1-9) Tracking Pull-in Process

Subsequently, the optical disc apparatus 1 executes the tracking pull-in process for starting the tracking control with respect to the track TR in the vicinity of the target track TG which is indicated by the address information for reproducing.

Upon starting the tracking pull-in process, the servo control unit 31 in the servo processing unit 30 of the optical disc apparatus 1 starts monitoring of the tracking error signal STE. In the tracking pull-in process, because the focus control is executed, the corrected pull-in signal SPIc ((A) in FIG. 29) takes a value exceeding a certain level, and the focus-in signal SFI ((C) in FIG. 29) is held at a "High" level.

As illustrated at (B) in FIG. 29, for example, when the zero-crossing point ZC is detected from the tracking error signal STE at a time point t31, the servo control unit 31 raises a zero-crossing point detection signal SZCt from a "Low" level to a "High" level and also raises a tracking servo control signal STB from a "Low" level to a "High" level.

With the rise of the tracking servo control signal STB being a trigger, the control unit 2 turns "ON" the tracking loop circuit. The optical disc apparatus 1 executes the tracking control based on the tracking error signal STE with feedback control such that the tracking error signal STE becomes zero, i.e., such that the main beam MB is irradiated to the track TR.

Then, the servo control unit 31 confirms the level of the on-track signal SOT at a time point t32 after the lapse of a predetermined tracking confirmation time from the time point t31. When the on-track signal SOT is at the "Low" level, the servo control unit 31 determines that the tracking control is not executed in a stable manner, and then causes the tracking servo control signal STB to fall from the "High" level to the "Low" level.

At the same time, the control unit 2 turns the tracking loop circuit from "ON" to "OFF". Further, the servo control unit 31 repeats again the processing, which has been executed from the time point t31, to detect the zero-crossing point ZC from the tracking error signal STE.

On the other hand, when the on-track signal SOT is held at the "High" level for a predetermined ON confirmation time, the servo control unit 31 recognizes that the tracking control is executed in a stable manner, and then causes the zero-crossing point detection signal SZCt to fall to the "Low" level. In that case, the servo control unit 31 starts an AGC process for adjusting the gain of the tracking error signal STE.

More specifically, when the servo control unit 31 (FIG. 26) in the servo processing unit 30 of the optical disc apparatus 1 starts the AGC control for the tracking error signal STE, the switching signal SSF is supplied to the switch 43, thus turning the switch 43 from "OFF" to "ON". Correspondingly, the corrected pull-in signal SPIc is supplied to the TE gain adjusting unit 42.

The TE gain adjusting unit 42 divides the corrected pull-in signal SPIc by the reference level signal SNT, which is supplied from the servo control unit 31, for normalizing the corrected pull-in signal SPIc, to thereby calculate a normalized pull-in value. Then, the TE gain adjusting unit 42 multiplies the normalized pull-in value by the reference gain value that is set in advance, thus determining a setting gain value. Further, the TE gain adjusting unit 42 multiplies the corrected focus error signal SFEc supplied thereto by the setting gain value, thus generating the tracking drive current DTE that is supplied to the phase compensating unit 44.

For the purpose of improving stability of the control system, the phase compensating unit 44 adjusts the phase of the tracking drive current DTE and outputs the adjusted tracking drive current DTE through the switch 45. As a result, the actuator 17 is supplied with the tracking drive current DTE generated based on the tracking error signal STE of which gain has been adjusted through the AGC process.

Thus, since the servo control unit 31 can determine the setting gain value based on the light quantity of the return light beam LRr from the track TR, the proper tracking drive current DTE can be supplied to the actuator 17 and the tracking control system can be stabilized.

Further, the optical disc apparatus 1 generates the reproduced signal SRF in accordance with the formula (7) while executing the focus control based on the corrected focus error signal SFEc and the tracking control based on the tracking error signal STE. The optical disc apparatus 1 then executes the information reproducing process by carrying out predetermined processes, such as a binary-coding process and a demodulation process, on the reproduced signal SRF.

During the information reproducing process, the control unit 2 monitors the focus-in signal SFI that represents the signal level of the corrected pull-in signal SPIc. When the focus-in signal SFI falls to the "Low" level, the control unit 2 recognizes that the focus control departs from the proper state, and then executes the focus pull-in process and the tracking pull-in process again.

In the optical disc apparatus 1, therefore, even when the focus control departs from the proper state due to a disturbance, for example, whether the focus control is in the proper state or not can be determined with high accuracy based on the corrected pull-in signal SPIc that is less affected by the de-track condition.

Also, during the information reproducing process, the control unit 2 monitors the on-track signal SOT that represents the signal level of the main pull-in signal SPIm. When the on-track signal SOT falls to the "Low" level, the control unit 2 recognizes that the tracking control departs from the proper state, and then executes the tracking pull-in process again.

In the optical disc apparatus 1, therefore, even when the tracking control departs from the proper state due to a disturbance, for example, the tracking control can be executed with high accuracy based on the corrected focus error signal SFEc that is less affected by the de-track condition.

As described above, in the optical disc apparatus 1, whether the focus control is in the proper state or not is confirmed based on the signal level of the corrected pull-in signal SPIc. Accordingly, the optical disc apparatus 1 can precisely determine whether the focus control is in the proper state, regardless of the positional relationship between the read light beam LR and the track TR.

Further, in the optical disc apparatus 1, whether the tracking control is in the proper state or not is confirmed based on the main pull-in signal SPIm. Accordingly, the optical disc apparatus 1 can precisely determine whether the tracking control is in the proper state, by utilizing the fact that the signal level of the main pull-in signal SPIm varies depending on the positional relationship between the main beam MB and the track TR.

(1-10) Processing Procedures

The information reproducing process executed in accordance with an information reproducing program will be described below with reference to flowcharts illustrated in FIGS. 30 to 33.

(1-10-1) Procedure for Information Reproducing Process

When a request for executing the information reproducing process on the optical disc 100 is applied from the external device, the optical disc apparatus 1 starts a procedure RT1 for the information reproducing process and proceeds to step SP1.

In step SP1, the optical disc apparatus 1 rotates the optical disc 100 at a desired rotational speed, and proceeds to next step SP2 in which the read light beam LR is emitted from the laser diode 11. Thereafter, the optical disc apparatus 1 proceeds to step SP3.

In step SP3, the optical disc apparatus 1 comes into a subroutine SRT11 to execute the number-of-layers counting process for counting the number of mark layers Y in the optical disc 100. Thereafter, the optical disc apparatus 1 proceeds to next step SP6.

In step SP6, the optical disc apparatus 1 comes into a subroutine SRT12 to execute the focus pull-in process for starting the focus control process with respect to the target mark layer YG. Thereafter, the optical disc apparatus 1 proceeds to next step SP7.

In step SP7, the optical disc apparatus 1 comes into a subroutine SRT13 to execute the tracking control process for starting the tracking pull-in process with respect to the vicinity of the target track TG. Thereafter, the optical disc apparatus 1 proceeds to next step SP8.

In step SP8, the optical disc apparatus 1 executes the various processes on the reproduced signal SRF and reproduces the information recorded on the optical disc 100. Thereafter, the optical disc apparatus 1 proceeds to next step SP9.

In step SP9, the optical disc apparatus 1 determines whether the focus-in signal SFI is at the "High" level.

If the result of the determination in step SP9 is "YES", the optical disc apparatus 1 proceeds to next step SP15 upon confirming that the focus of the read light beam LR and the target mark layer YG are close to each other and that the focus control is properly executed with respect to the target mark layer YG.

On the other hand, if the result of the determination in step SP9 is "NO", this implies that the focus control is not properly executed with respect to the target mark layer YG. Accordingly, the optical disc apparatus 1 proceeds to step SP10 in which the focus AGC circuit is turned "OFF". Thereafter, the optical disc apparatus 1 proceeds to next step SP11.

After turning the focus AGC circuit "OFF" in step SP11, the optical disc apparatus 1 proceeds to next step SP12 and then to step SP13 in which the tracking loop circuit and the focus loop circuit are turned "OFF", respectively. Then, the optical disc apparatus 1 returns to step SP6 to successively execute the focus pull-in process and the tracking pull-in process again.

In step SP15, the optical disc apparatus 1 determines whether the on-track signal SOT is at the "High" level. If the result of the determination in step SP15 is "YES", the optical disc apparatus 1 proceeds to next step SP19 upon recognizing that the tracking control is properly executed with respect to the target track TG.

On the other hand, if the result of the determination in step SP15 is "NO", this implies that the tracking control is not properly executed with respect to the target track TG. In this case, the optical disc apparatus 1 proceeds to step SP16.

In step SP16, the optical disc apparatus 1 turns the tracking AGC circuit "OFF". Thereafter, the optical disc apparatus 1 proceeds to next step SP17 in which tracking loop circuit is turned "OFF". The optical disc apparatus 1 then returns to step SP7 to execute the tracking pull-in process again.

In step SP19, the optical disc apparatus 1 determines whether an end of the information reproducing process is instructed from the external device. If the result of the determination in step SP19 is "NO", the optical disc apparatus 1 returns to step SP8 to continue the reproducing of information from the optical disc 100.

On the other hand, if the result of the determination in step SP19 is "YES", the optical disc apparatus 1 proceeds to an end step to terminate the procedure RT1 for the information reproducing process.

(1-10-2) Procedure for Number-of-Layers Counting Process

Figure 31:
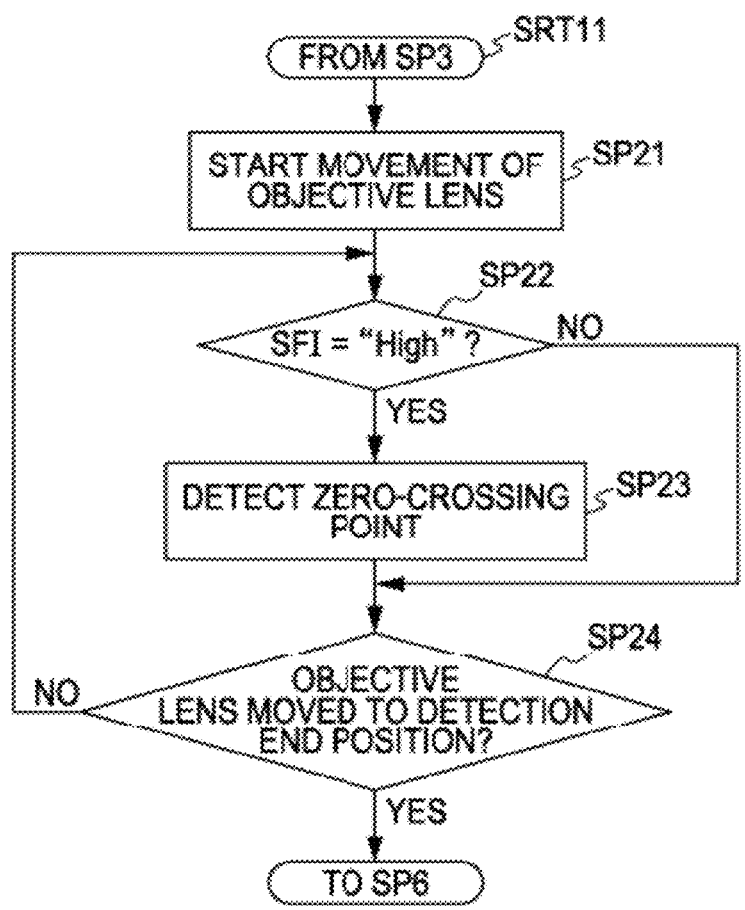
FIG. 31 is a flowchart to explain a procedure for the number-of-layers counting process.

A procedure for the number-of-layers counting process will be described below with reference to a flowchart (subroutine SRT11) illustrated in FIG. 31.

In step SP3 in the procedure RT1 for the information reproducing process (FIG. 30), the optical disc apparatus 1 comes into step SP21 of the subroutine SRT11.

In step SP21, the optical disc apparatus 1 starts to move the objective lens 16 from the remotest position in the direction approaching the optical disc 100. Subsequently, the optical disc apparatus 1 proceeds to next step SP22.

In step SP22, the optical disc apparatus 1 determines whether the focus-in signal SFI is at the "High" level. If the result of the determination in step SP22 is "NO", the optical disc apparatus 1 proceeds to next step SP24.

On the other hand, if the result of the determination in step SP22 is "YES", this implies that the focus of the read light beam LR is positioned in the vicinity of the mark layer Y. In this case, the optical disc apparatus 1 proceeds to next step SP23.

In step SP23, when the zero-crossing point ZC is detected from the corrected focus error signal SFEc, the optical disc apparatus 1 counts up the count value N by "1". Thereafter, the optical disc apparatus 1 proceeds to step SP24.

In step SP24, the optical disc apparatus 1 determines whether the objective lens 16 has been moved to the detection end position. If the result of the determination in step SP24 is "NO", the optical disc apparatus 1 returns to step SP22 to continue the process.

On the other hand, if the result of the determination in step SP24 is "YES", the optical disc apparatus 1 recognizes the current count value N as the number of mark layers Y in the optical disc 100. Then, the optical disc apparatus 1 proceeds to an end step to terminate the number-of-layers counting process. Subsequently, the optical disc apparatus 1 shifts to step SP6 of the procedure RT1 for the information reproducing process.

(1-10-3) Procedure for Focus Pull-in Process

Figure 32:
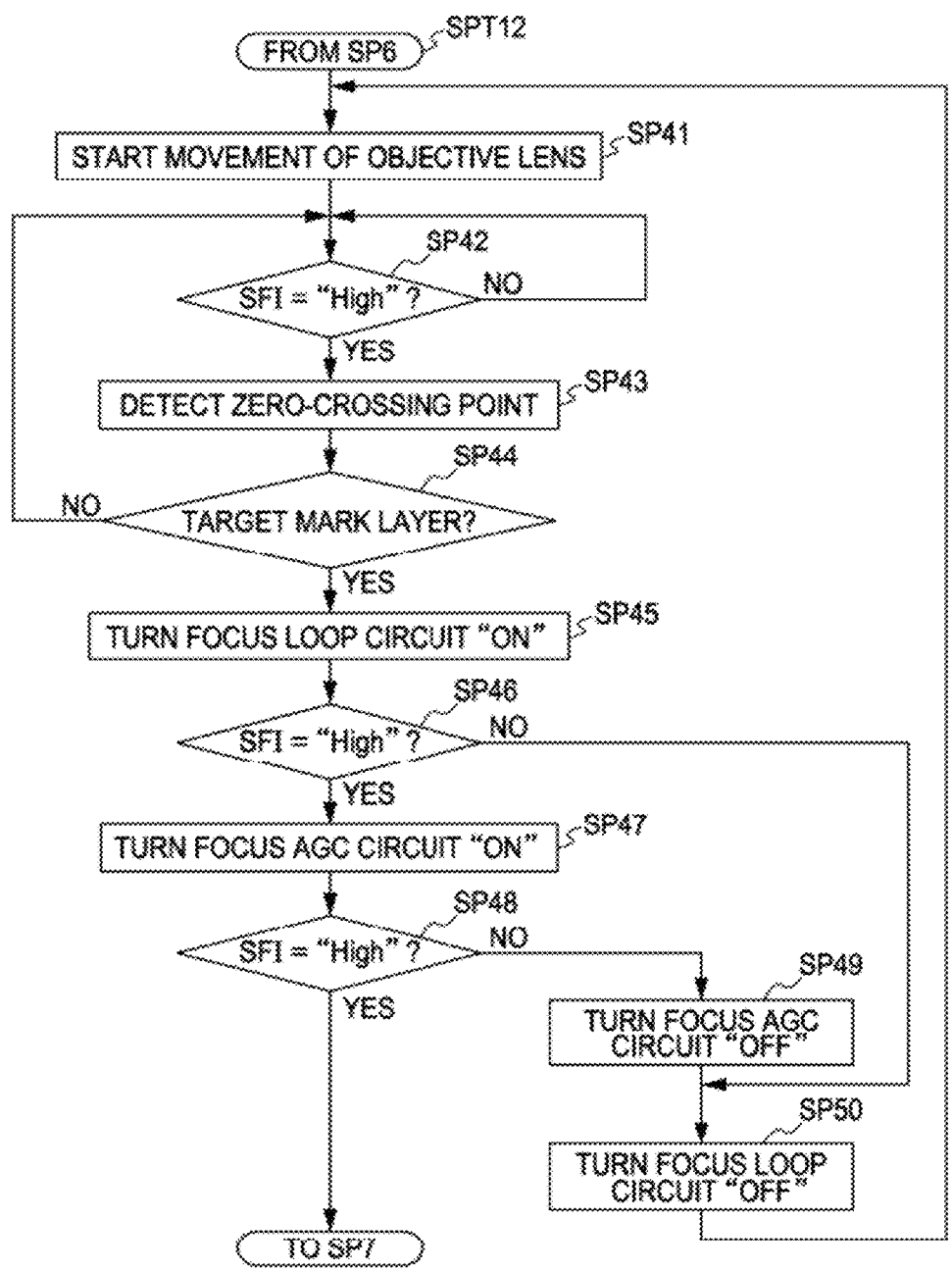
FIG. 32 is a flowchart to explain a procedure for the focus pull-in process.

A procedure for the focus pull-in process will be described below with reference to a flowchart (subroutine SRT12) illustrated in FIG. 32.

In step SP6 in the procedure RT1 for the information reproducing process (FIG. 30), the optical disc apparatus 1 comes into step SP41 of the subroutine SRT12.

In step SP41, the optical disc apparatus 1 starts to move the objective lens 16 from the remotest position in the direction approaching the optical disc 100. Subsequently, the optical disc apparatus 1 proceeds to next step SP42.

In step SP42, the optical disc apparatus 1 determines whether the focus-in signal SFI is at the "High" level. If the result of the determination in step SP42 is "NO", the optical disc apparatus 1 waits until the determination result of "YES" is obtained in step SP42.

On the other hand, if the result of the determination in step SP42 is "YES", this implies that the focus of the read light beam LR is positioned in the vicinity of the mark layer Y. In this case, the optical disc apparatus 1 proceeds to next step SP43.

In step SP43, when the zero-crossing point ZC is detected from the corrected focus error signal SFEc, the optical disc apparatus 1 counts up the count value N by "1". Thereafter, the optical disc apparatus 1 proceeds to next step SP44.

In step SP44, the optical disc apparatus 1 determines, based on the count value N, whether the mark layer Y in the focused state at that time is the target mark layer YG which is indicated by the address information for reproducing. If the result of the determination in step SP44 is "NO", the optical disc apparatus 1 returns to step SP42 to continue the process.

On the other hand, if the result of the determination in step SP44 is "YES", this implies that the target mark layer YG is in the focused state at that time. In this case, the optical disc apparatus 1 proceeds to next step SP45.

In step SP45, the optical disc apparatus 1 turns the focus loop circuit "ON" and then proceeds to next step SP46.

In step SP46, at a time point after the lapse of the predetermined focus confirmation time, the optical disc apparatus 1 determines whether the focus-in signal SFI is at the "High" level. If the result of the determination in step SP46 is "NO", this implies that the focus of the read light beam LR is not positioned in the vicinity of the mark layer Y and that the focus control is not properly executed. In this case, the optical disc apparatus 1 proceeds to next step SP50.

On the other hand, if the result of the determination in step SP46 is "YES", the optical disc apparatus 1 proceeds to next step SP47 upon recognizing that the focus control is properly executed.

In step SP47, the optical disc apparatus 1 turns the focus AGC circuit "ON" and then proceeds to next step SP48.

In step SP48, the optical disc apparatus 1 determines whether the focus-in signal SFI is at the "High" level. If the result of the determination in step SP48 is "NO", the optical disc apparatus 1 proceeds to next step SP49.

In step SP49, the optical disc apparatus 1 turns the focus AGC circuit "OFF" and then proceeds to next step SP50.

After turning the focus loop circuit "OFF" in step SP50, the optical disc apparatus 1 returns to step SP41 to execute the focus pull-in process again.

On the other hand, if the result of the determination in step SP48 is "YES", this implies that the focus control is properly executed with respect to the target mark layer YG. In this case, the optical disc apparatus 1 shifts to step SP7 of the procedure RT1 for the information reproducing process.

(1-10-4) Procedure for Tracking Pull-in Process

Figure 33:
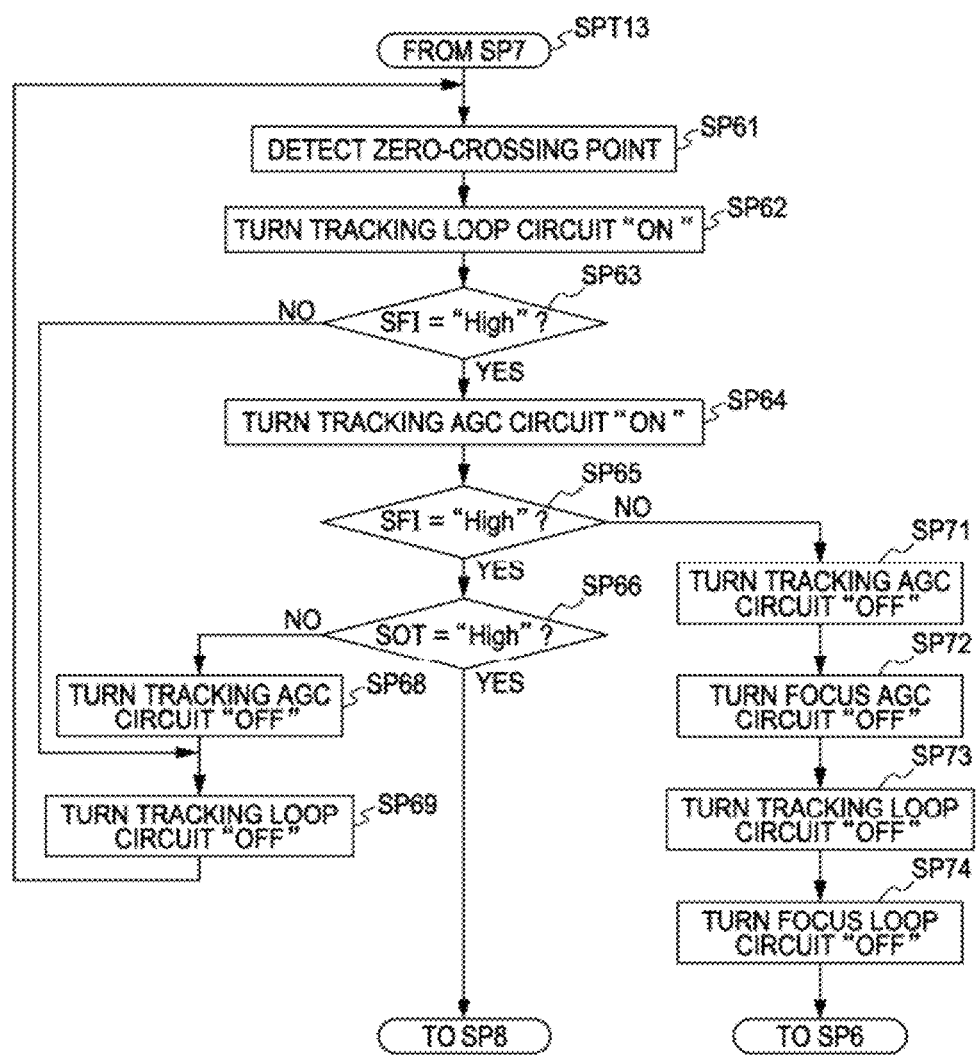
FIG. 33 is a flowchart to explain a procedure for the tracking pull-in process.

A procedure for the tracking pull-in process will be described below with reference to a flowchart (subroutine SRT13) illustrated in FIG. 33.

In step SP7 in the procedure RT1 for the information reproducing process (FIG. 30), the optical disc apparatus 1 comes into step SP61 of the subroutine SRT13.

In step SP61, when the zero-crossing point ZC is detected from the tracking error signal STE, the optical disc apparatus 1 proceeds to next step SP62.

In step SP62, the optical disc apparatus 1 turns the tracking loop circuit "ON" and then proceeds to next step SP63.

In step SP63, the optical disc apparatus 1 determines whether the focus-in signal SFI is at the "High" level. If the result of the determination in step SP63 is "NO", the optical disc apparatus 1 proceeds to next step SP69 upon recognizing that the focus control is not properly executed.

On the other hand, if the result of the determination in step SP63 is "YES", the optical disc apparatus 1 proceeds to next step SP64 upon recognizing that the focus control is properly executed.

In step SP64, the optical disc apparatus 1 turns the tracking AGC circuit "ON" and then proceeds to next step SP65.

In step SP65, the optical disc apparatus 1 determines whether the focus-in signal SFI is at the "High" level. If the result of the determination in step SP65 is "NO", the optical disc apparatus 1 proceeds to next step SP71 upon recognizing that the focus control is not properly executed.

In step SP71, the optical disc apparatus 1 turns the tracking AGC circuit "OFF". After turning "OFF" the focus AGC circuit, the tracking loop circuit, and the focus loop circuit in subsequent steps SP72, SP73 and SP74, respectively, the optical disc apparatus 1 returns to step SP6 of the procedure RT1 for the information reproducing process (FIG. 30) to execute the processing from the focus pull-in process again.

On the other hand, if the result of the determination in step SP65 is "YES", the optical disc apparatus 1 proceeds to step SP66 upon recognizing that the focus control is properly executed.

In step SP66, the optical disc apparatus 1 determines whether the on-track signal SOT is at the "High" level. If the result of the determination in step SP66 is "NO", this implies that the tracking control is not properly executed with respect to the target track TG. In this case, the optical disc apparatus 1 proceeds to next step SP68.

In step SP68, the optical disc apparatus 1 turns the tracking AGC circuit "OFF" and then proceeds to next step SP69. In step SP69, the optical disc apparatus 1 turns the tracking loop circuit "OFF". Thereafter, the optical disc apparatus 1 returns to step SP61 to execute the tracking pull-in process again.

On the other hand, if the result of the determination in step SP66 is "YES", this implies that the tracking control is properly executed with respect to the target track TG. In this case, the optical disc apparatus 1 shifts to step SP8 of the procedure RT1 for the information reproducing process (FIG. 30) to execute reproducing of information.

(1-11) Operations and Advantages

In the optical disc apparatus 1 constructed as described above, the read light beam LR, i.e., the light beam emitted from the laser diode 11 as the light source, is separated into the main beam MB and the sub-beam SB, and the separated light beams are condensed and irradiated to the optical disc 100 having the uniform recording layer 101 in which the track TR is formed by the record marks RM.

Also, in the optical disc apparatus 1, by irradiating the sub-beam SB, having substantially the same spot diameter as the main beam MB, in a state shifted from the main beam MB in the radial direction, i.e., in the direction of radius of the optical disc 100, at least part of the sub-beam SB is irradiated to an area in which the main beam MB is not irradiated in the radial direction.

Further, in the optical disc apparatus 1, the corrected pull-in signal SPIc is generated, based on the main beam MB and the sub-beam SB, as the mark layer distance signal representing the distance between the focus of the read light beam LR and the mark layer Y to which the track TR belongs.

Thus, according to the optical disc apparatus 1, since either the main beam MB or the sub-beam SB is irradiated to the track TR, the corrected pull-in signal SPIc can be generated based on the return light beam LRr from the track TR. Therefore, the optical disc apparatus 1 can generate the corrected pull-in signal SPIc having a signal level that increases as the distance between the focus of the read light beam LR and the mark layer Y decreases.

Stated another way, according to the optical disc apparatus 1, when the main beam MB is irradiated to a position deviated from the track TR, at least part of the sub-beam SB is irradiated to the track TR. Hence, a change in the light quantity of the main return light beam MBr can be compensated for by a change in the light quantity of the sub-return light beam SBr.

In the optical disc apparatus 1, the corrected pull-in signal SPIc is generated in accordance with the above-mentioned formula (3) based on the sum light quantity of the main return light beam MBr resulting from the main beam MB and the sum light quantity of the sub-return light beam SBr resulting from the sub-beam SB. According to the optical disc apparatus 1, therefore, a variation in the signal level depending on the positional relationship between the read light beam LR and the track TR can be reduced as illustrated in FIG. 20B.

Further, in the optical disc apparatus 1, the corrected focus error signal SFEc representing the deviation between the focus of the read light beam LR and the mark layer Y is generated in accordance with the above-mentioned formula (4) based on the light quantity of the main return light beam MBr resulting from the main beam MB and the light quantity of the sub-return light beams SBr resulting from the sub-beam SB.

According to the optical disc apparatus 1, therefore, a variation in the signal level depending on the positional relationship between the read light beam LR and the track TR can be reduced as illustrated in FIG. 19B, and the corrected focus error signal SFEc can precisely represent the deviation between the focus of the read light beam LR and the mark layer Y.

Stated another way, even in a state where the optical disc apparatus 1 is under execution of the tracking control after starting to reproduce information, the focus control can be executed with high accuracy by using the corrected focus error signal SFEc even in the de-tracked condition caused by a disturbance, for example.

In the optical disc apparatus 1, the objective lens 16 is driven by the actuator 17, which serves as a focus drive unit, to move in the focusing direction closer to and farther away from the optical disc 100. Further, in the optical disc apparatus 1, when the corrected pull-in signal SPIc becomes equal to or higher than the predetermined focus-in threshold AFI, the zero-crossing point ZC is detected as a point at which the corrected focus error signal SFEc, i.e., a focus deviation signal representing the deviation between the focus of the read light beam LR and the mark layer Y, intersects the reference level SL.

The optical disc apparatus 1 counts the number of zero-crossing points detected while the objective lens 16 is moved through a predetermined movement zone from the remotest position maximally away from the optical disc 100 to the end-of-detection position.

In the related-art optical disc apparatus, the zero-crossing point ZC is detected from the focus error signal SFE when the ordinary pull-in signal SPI, provided as the sum light quantity of the main return light beam MBr, becomes equal to or higher than the predetermined focus-in threshold AFI. Therefore, the related-art optical disc apparatus can detect only the mark layer Y without detecting the zero-crossing point ZC due to noise, etc. imposed on the focus error signal SFE.

In the case of using the optical disc 100 or the like in which the signal recording surface is not provided and the record marks RM are formed in the uniform recording layer 101, however, the sum light quantity of the main return light beam MBr does not represent the distance between the focus of the read light beam LR and the mark layer Y to which the track TR belongs. Accordingly, the number of mark layers Y is not precisely detected in the same manner as that used in the related-art optical disc apparatus.

In contrast, according to the optical disc apparatus 1, since the corrected pull-in signal SPIc represents the distance between the focus of the read light beam LR and the mark layer Y to which the track TR belongs, the number of mark layers Y can be precisely detected by using the corrected pull-in signal SPIc even for the optical disc 100 unlike the related-art optical disc apparatus.

In the optical disc apparatus 1, the objective lens 16 is driven to move in the focusing direction, and the actuator 17 is feedback-controlled based on the corrected focus error signal SFEc such that the corrected focus error signal SFEc is held at the reference level SL. Further, in the optical disc apparatus 1, whether the feedback control is properly executed or not is confirmed based on the signal level of the corrected pull-in signal SPIc.

According to the optical disc apparatus 1, whether the feedback control is properly executed or not can be precisely confirmed by using the corrected pull-in signal SPIc that has a small variation in its signal level depending on the positional relationship between the track TR and the read light beam LR.

Thus, even in a state where the optical disc apparatus 1 is under execution of the tracking control after starting to reproduce information, whether the focus control is properly executed or not can be confirmed with high accuracy by using the corrected pull-in signal SPIc even in the de-tracked condition caused by a disturbance, for example.

Still further, in the optical disc apparatus 1, when the corrected pull-in signal SPIc becomes equal to or higher than the predetermined focus-in threshold AFI, the zero-crossing point ZC is detected from the corrected focus error signal SFEc and the feedback control is started corresponding to the detected zero-crossing point ZC.

According to the optical disc apparatus 1, therefore, by using the corrected pull-in signal SPIc, the zero-crossing point ZC can be avoided from being detected due to noise, etc. imposed on the focus error signal SFE, and the feedback control can be reliably started with respect to the target mark position YG.

In the optical disc apparatus 1, the signal level of the corrected pull-in signal SPIc is normalized and multiplied by a reference gain, thus correcting the signal level of the corrected focus error signal SFEc.

According to the optical disc apparatus 1, therefore, since a variation in the corrected focus error signal SFEc corresponding to a change in the light quantity of the return light beam LRr can be compensated for, stability of the focus control system can be improved.

In the optical disc apparatus 1, the objective lens 16 is driven in the radial direction, and the actuator 17 is feedback-controlled based on the tracking error signal STE, representing the deviation between the focus of the read light beam LRr and the mark layer Y, such that the tracking error signal STE is held at the reference level SL. Further, in the optical disc apparatus 1, whether the feedback control is properly executed or not is confirmed based on the main pull-in signal SPIm representing the sum light quantity of the main return light beam MBr.

According to the optical disc apparatus 1, therefore, by utilizing such a characteristic of the main pull-in signal SPIm that the light quantity thereof greatly varies depending on the positional relationship between the main beam MB and the track TR, whether the tracking control is properly executed or not can be confirmed with higher accuracy than that in the optical disc apparatus in which whether the tracking control is properly executed or not is confirmed based on a slight variation in the pull-in signal SPI.

Thus, in the optical disc apparatus 1 constructed as described above, the main beam MB and the sub-beam SB are irradiated to both the track TR and the space area AR where the track TR is not formed, and the corrected pull-in signal SPIc or the corrected focus error signal SFEc is generated, as the mark layer distance signal representing the distance between the focus of the read light beam LR and the mark layer Y, based on the return light beam LRr resulting from at least one of the main beam MB and the sub-beam SB.

Accordingly, the optical disc apparatus 1 can generate the corrected pull-in signal SPIc or the corrected focus error signal SFEc based on the return light beam LRr resulting from the entirety of the mark layer Y which includes the track TR and the space area AR. As a result, the optical disc apparatus 1 can realize an optical disc apparatus and a signal generation method which can reduce a change in the light quantity of the return light beam LRr caused depending on a variation in position of the read light beam LR relative to the track TR, and which can improve accuracy of the mark layer distance signal.

(2) Second Embodiment (2-1) Irradiation of Sub-Beams and Generation of Signals

Figure 34:
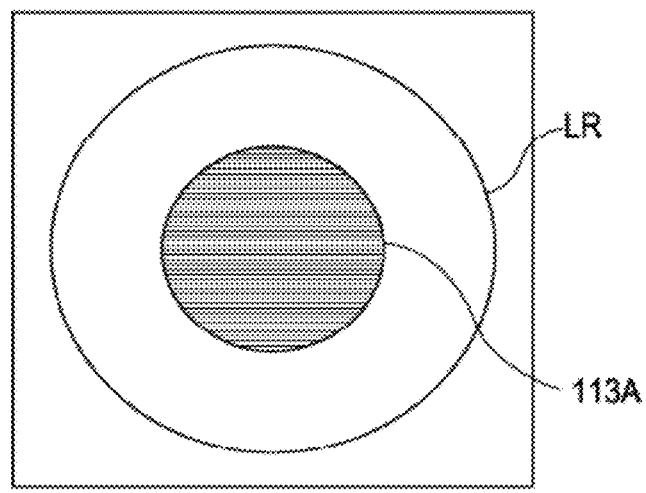
FIG. 34 illustrates a configuration of a grating according to a second embodiment.
Figure 35:
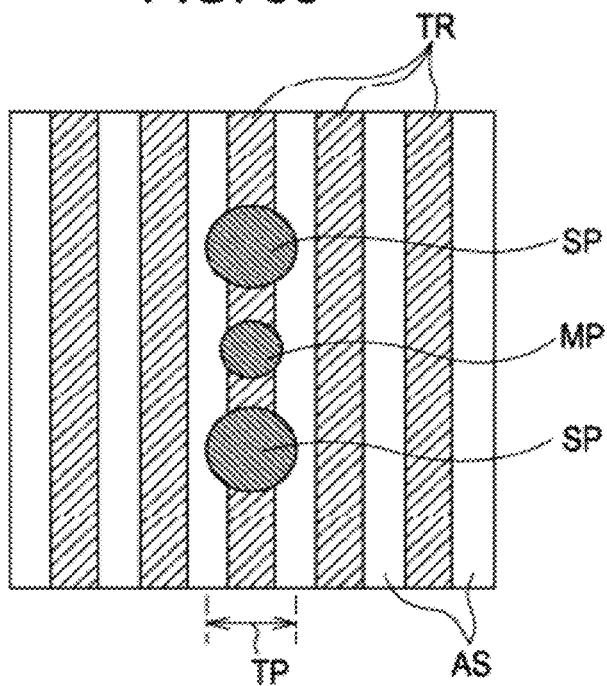
FIG. 35 illustrates irradiation of light beams according to the second embodiment.

FIGS. 34 to 36 illustrate a second embodiment in which components corresponding to those in the first embodiment, illustrated in FIGS. 1 to 33, are denoted by the same reference characters. The second embodiment differs from the first embodiment in the positions of the sub-beams SB relative to the track TR and the sizes of the sub-spots SP. The construction of an optical disc apparatus 111 according to the second embodiment is the same as that of the optical disc apparatus 1 according to the first embodiment, and therefore a description thereof is not repeated here.

As illustrated in FIG. 34, a grating 113 corresponding to the grating 13 in the first embodiment has a diffraction grating portion 113A formed only in a central portion of the grating 113. The diffraction grating portion 113A has a size smaller than the light flux diameter of the read light beam LR to generate the sub-beams SB each having a small light flux diameter that corresponds to only the central portion of the read light beam LR.

In other words, the main beam MB having a large light flux diameter and the sub-beam SB having the small light flux diameter are formed so as to enter the object lens 16. Accordingly, since the main beam MB causes the objective lens 16 to act as a lens having the same NA (Numerical Aperture) as that of the objective lens 16 itself, a main spot MP having a smaller diameter is formed on the track TR, as illustrated in FIG. 35.

On the other hand, since the sub-beam SB causes the objective lens 16 to act as a lens having the NA (Numerical Aperture) smaller than that of the objective lens 16 itself, a sub-spot SP having a larger diameter is formed on the track TR.

The sub-spot SP is adjusted by the diameter of the diffraction grating portion 113A so as to have a spot diameter that is substantially equal to the track pitch TP. Hence, the sub-beam SB is irradiated to both the track TR and the space area AS in the mark layer Y.

As illustrated in FIG. 36, a photodetector 120 corresponding to the photodetector 20 in the first embodiment includes, similarly to photodetector 20, a main spot detector 121 and sub-spot detectors 122 and 123 each having four detection areas in the form divided into two in each of the vertical and horizontal directions. In the photodetector 120, respective detection areas 122A to 122D and 123A to 123D of the sub-spot detectors 122 and 123 are formed to be larger than detection areas 121A to 121D of the main spot detector 121. The reason is that the sub-return light beam SBr has a larger spot diameter than the main return light beam MBr.

A signal processing unit 104 corresponding to the signal processing unit 4 in the first embodiment generates the corrected pull-in signal SPIc in accordance with the following formula (8):

$$SPIc2=(US1a+US1b+US1c+US1d)+(US2a+US2b+US2c+US2d) \quad (8)$$

Thus, in the optical disc apparatus 111, since the sub-beams SB are each irradiated so as to cover both the track TR and the space area AS, the sub-beams SB are irradiated to the track TR with certainty. Therefore, the optical disc apparatus 111 generates the corrected pull-in signal SPIc by using only the sub-beams SB.

Further, in the optical disc apparatus 111, the ordinary focus error signal SFE generated from the main beam MB in accordance with the following formula (9) is used instead of the corrected focus error signal SFEc.

$$SFE=(UMa+UMc)-(UMb+UMd) \quad (9)$$

Incidentally, in the optical disc apparatus 111, the tracking error signal STE is generated from the main beam MB by using, e.g., the push-pull method or the 1-spot push-pull method.

According to the optical disc apparatus 111, as described above, the spot diameter of the sub-spot SP is increased to such an extent that the sub-beam SB is irradiated to both the track TR and the space area AS. Therefore, the optical disc apparatus 111 ensures that the sub-beam SB is irradiated to the track TR with certainty and that the sum light quantity of the sub-return light beam SBr resulting from the sub-beam SB represents the distance between the focus of the read light beam LR and the mark layer Y.

(2-2) Operations and Advantages

In the optical disc apparatus 111 constructed as described above, the spot diameter of the sub-beam SB is increased to be larger than the spot diameter of the main beam MB such that the sub-beam SB is irradiated to both the track TR and the space area AS where the track TR is not formed. Further, in the optical disc apparatus 111, the corrected pull-in signal SPIc is generated, as the mark layer distance signal, based on the sub-return light beam SBr resulting from the sub-beam SB.

Thus, according to the optical disc apparatus 111, since the sub-beam SB is irradiated to the track TR with certainty regardless of the positional relationship between the track TR and the sub-beam SB, the corrected pull-in signal SPIc can be generated which has a smaller variation in its signal level depending on the positional relationship between the track TR and the sub-beam SB.

Further, in the optical disc apparatus 111, by making the light flux diameter of the sub-beam SB smaller than the light flux diameter of the main beam MB, the spot diameter of the sub-beam SB is increased to be larger than the spot diameter of the main beam MB to such an extent that the sub-beam SB can be irradiated to both the track TR and the space area AS.

According to the optical disc apparatus 111 thus constructed, the sub-beam SB is irradiated to both the track TR and the space area AS, and the corrected pull-in signal SPIc is generated based on the sub-return light beam SBr resulting from the sub-beam SB. Since the sub-beam SB is irradiated to the track TR with certainty, the optical disc apparatus 111 can generate the corrected pull-in signal SPIc which has a smaller variation in its signal level depending on the positional relationship between the track TR and the sub-beam SB.

(3) Other Embodiments

While the first embodiment has been described above as generating the corrected pull-in signal SPIc and the corrected focus error signal SFEc based on the main return light beam MBr and the two sub-return light beams SBr, the embodiment of the present invention is not limited to that case. In the first embodiment of the present invention, it is just necessary that the corrected pull-in signal SPIc or the corrected focus error signal SFEc is generated based on the return light beam LRr resulting from at least one read light beam LR irradiated to the track TR. As another example, the corrected pull-in signal SPIc or the corrected focus error signal SFEc may be generated based on the main return light beam MBr and one sub-return light beam SBr.

Further, the optical disc apparatus may be modified so as to select at least one of the main beam MB and the sub-beam SB, which has been irradiated to the track TR, and to generate the corrected pull-in signal SPIc or the corrected focus error signal SFEc based on the selected light beam. In that case, for example, the light beam irradiated to the track TR is selected by calculating a light quantity ratio between the main return light beam MBr resulting from the main beam MB and the sub-return light beam SBr resulting from the sub-beam SB, and the corrected pull-in signal SPIc or the corrected focus error signal SFEc is generated based on the selected return light beam LRr.

In the optical disc apparatus 1, for example, the main pull-in signal SPIm representing the light quantity of the main beam MB is generated in accordance with the foregoing formula (5), and a sub-pull-in signal SPIs representing the light quantity of the sub-beams is generated in accordance with the following formula (10):

$$SPIs=k\{(US1a+US1b+US1c+US1d)+(US2a+US2b+US2c+US2d)\} \quad (10)$$

The optical disc apparatus 1 employs, as the corrected pull-in signal SPIc, the signal SPIm or SPIs having a higher signal level. Further, in the optical disc apparatus 1, when the light quantity of the sub-pull-in signal SPIs is larger, a sub-focus error signal SFEs is generated in accordance with the following formula (11). The sub-focus error signal SFEs can be used in the number-of-layers counting process. Note that a similar sub-focus error signal SFEs can also be generated in the second embodiment.

$$SFEs=(US1a+US1c)-(US1b+US1d)+(US2a+US2c)-(US2b+US2d) \quad (11)$$

Figure 37:
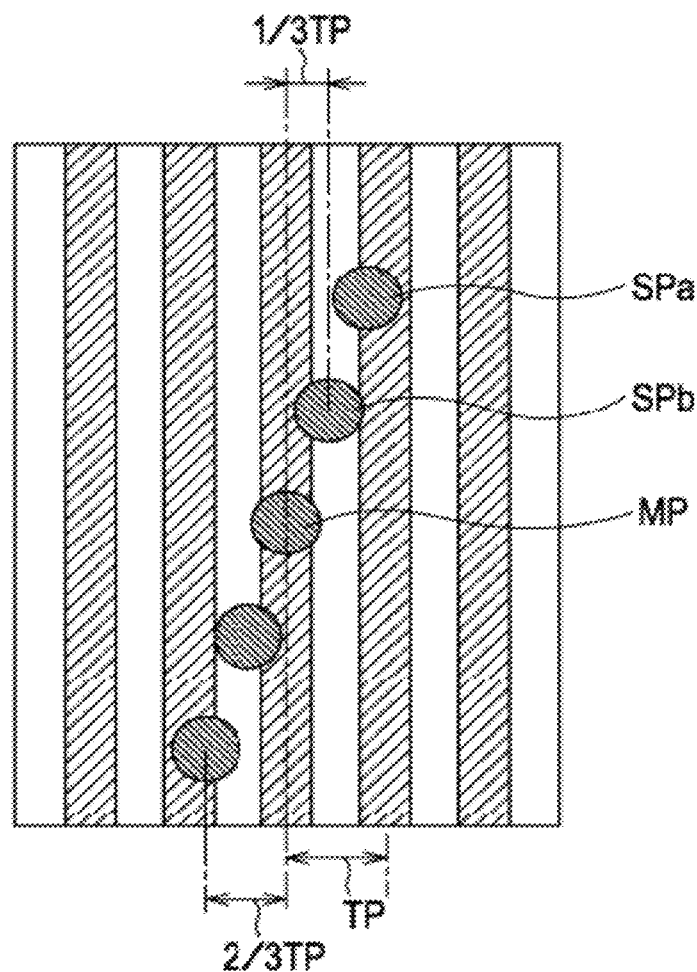
FIG. 37 illustrates irradiation of light beams according to still another embodiment.

While the first and second embodiments have been described above as irradiating the main beam MB and the two sub-beams SB to the optical disc 100, the embodiment of the present invention is not limited to that case. In a modified embodiment of the present invention, for example, four sub-beams SB may be irradiated as illustrated in FIG. 37. In such a modification, either the main beam MB or the sub-beams SB can be irradiated to the track TR with higher certainty by forming those beams such that two pairs of the sub-beams SB are shifted from the main beam MB at intervals of ⅓ of the track pitch TP.

While the first embodiment has been described above as executing the AGC process on the corrected focus error signal SFEc and the tracking error signal STE, the embodiment of the present invention is not limited to that case and it is not necessary to execute the AGC process.

While the first embodiment has been described above as confirming, based on the on-track signal SOT, whether the tracking control is properly executed, the embodiment of the present invention is not limited to that case and it is not necessary to confirm whether the tracking control is properly executed.

While the second embodiment has been described above as irradiating the sub-beam SB having a diameter, which is substantially the same as the track pitch TP, the embodiment of the present invention is not limited to that case. In another embodiment of the present invention, for example, the spot diameter of the sub-beam SB can be determined, taking into account a Gauss distribution of the sub-beam SB, such that a variation in the signal level of the corrected pull-in signal SPIc in the de-track condition is minimized. Note that the spot diameter of the sub-beam SB can be changed corresponding to the diameter of the diffraction grating portion 113A.

While the first and second embodiments have been described above as generating the corrected focus error signal SFEc in accordance with the astigmatism method, the embodiment of the present invention is not limited to that case. In another embodiment of the present invention, the corrected focus error signal SFEc can be generated by using suitable one of other various methods including the spot size method, for example.

While the first and second embodiments have been described above as generating the tracking error signal STE in accordance with the DPP (Differential Push-Pull) method, the embodiment of the present invention is not limited to that case. In another embodiment of the present invention, the tracking error signal STE can be generated by using suitable one of other various methods including the push-pull method and the DPD (Differential Phase Detection) method, for example.

While the first and second embodiments have been described above as forming, as spatial (three-dimensional) record marks, the record marks RM in the form of hologram in the recording layer 101, the embodiment of the present invention is not limited to that case. For example, the record marks RM may be formed as air bubbles.

While the first and second embodiments have been described above as forming a plurality of mark layers Y in the recording layer 101, the embodiment of the present invention is not limited to that case. As another example, only one mark layer Y may be formed.

While the first and second embodiments have been described above as forming the track TR in a spiral pattern in the recording layer 101, the embodiment of the present invention is not limited to that case. As another example, reference tracks may be formed in a concentric pattern.

While the first and second embodiments have been described above in connection with the optical disc apparatus 1 which is constructed as an information reproducing apparatus just adapted for reproducing information, the embodiment of the present invention is not limited to that case. The present invention can also be similarly applied to an information recording and reproducing apparatus adapted for recording and reproducing information.

While the first embodiment has been described above as executing the number-of-layers counting process, the focus pull-in process, and the tracking pull-in process when the information reproducing process is executed, the embodiment of the present invention is not limited to that case. The embodiment of the present invention can be modified, for example, so as to execute the number-of-layers counting process when the optical disc 100 is loaded, or to execute the number-of-layers counting process, the focus pull-in process, and the tracking pull-in process when the information reproducing process is started.

While the first and second embodiments have been described above as irradiating the read light beam LR of 405 nm to the optical disc 100, the embodiment of the present invention is not limited to that case. In another embodiment of the present invention, the light beam may be irradiated at suitable one of other various wavelengths.

While the first embodiment has been described above as constructing the optical disc apparatus 1 (i.e., an optical disc apparatus in claims) by using the grating 13 (i.e., a light separator in claims), the objective lens 16 (i.e., an objective lens in claims), and the signal processing unit 4 (i.e., a signal generating unit in claims), the embodiment of the present invention is not limited to that case. An optical disc apparatuses according to another embodiment of the present invention may also be constructed by using a light separator, an objective lens, and a signal generating unit, each of which has suitable one of other various constructions than those described in the first embodiment.

The present application contains subject matter related to that disclosed in Japanese Priority Patent Application JP 2008-198447 filed in the Japan Patent Office on Jul. 31, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
   a light separator configured to separate a light beam emitted from a light source into a main beam and a sub-beam;
   an objective lens configured to, when the light beam is condensed and irradiated to an optical disc having a uniform recording layer in which a track is formed by record marks, irradiate at least part of the sub-beam to an area where the main beam is not irradiated in a radial direction which is defined as a direction of radius of the optical disc; and
   a signal generating unit configured to generate a mark layer distance signal, representing a distance between a focus of the light beam and a mark layer to which the track belongs, based on a return light beam resulting from at least one of the main beam and the sub-beam, which has been irradiated to the track;
   wherein the mark layer distance signal is a corrected pull-in signal having a signal level that increases as the distance between the focus of the light beam and the mark layer decreases.

2. The optical disc apparatus according to claim 1, wherein the mark layer distance signal is a corrected focus error signal representing a deviation between the focus of the light beam and the mark layer.

3. The optical disc apparatus according to claim 1, wherein the objective lens causes the sub-beam, having substantially a same spot diameter as the main beam, to be irradiated in a state shifted from the main beam in the radial direction.

4. The optical disc apparatus according to claim 3, wherein the signal generating unit generates a corrected pull-in signal, having a signal level that increases as the distance between the focus of the light beam and the mark layer decreases, based on a sum light quantity of a main return light beam resulting from the main beam and a sum light quantity of a sub-return light beam resulting from the sub-beam.

5. The optical disc apparatus according to claim 3, wherein the signal generating unit generates a corrected focus error signal, representing a deviation between the focus of the light beam and the mark layer, based on a light quantity of a main return light beam resulting from the main beam and a light quantity of a sub-return light beam resulting from the sub-beam.

6. The optical disc apparatus according to claim 1, further comprising:
   a focus drive unit configured to drive the objective lens to move in a focusing direction closer to and farther away from the optical disc;
   a focus zero-crossing point detecting unit configured to, when the corrected pull-in signal becomes equal to or higher than a predetermined detection threshold, detect a zero-crossing point at which a focus deviation signal, representing a deviation between the focus of the light beam and the mark layer, intersects a reference level; and
   a counting unit configured to count a number of zero-crossing points detected while the objective lens is moved through a predetermined movement zone.

7. The optical disc apparatus according to claim 6, wherein the focus deviation signal is a corrected focus error signal that is obtained as the mark layer distance signal.

8. The optical disc apparatus according to claim 1, further comprising:
   a focus drive unit configured to drive the objective lens to move in a focusing direction closer to and farther away from the optical disc; and
   a focus feedback control unit configured to feedback control the focus drive unit based on a focus deviation signal, representing a deviation between the focus of the light beam and the mark layer, such that the focus deviation signal is held at a reference level, and configured to confirm, based on the signal level of the corrected pull-in signal, whether the feedback control of the focus drive unit is properly executed.

9. The optical disc apparatus according to claim 8, further comprising:
   a focus zero-crossing point detecting unit configured to, when the corrected pull-in signal becomes equal to or higher than a predetermined detection threshold, detect a zero-crossing point at which the focus deviation signal, representing the deviation between the focus of the light beam and the mark layer, intersects the reference level; and
   a focus control starting unit configured to start the feedback control by the focus feedback control unit corresponding to the zero-crossing point.

10. The optical disc apparatus according to claim 8, wherein the focus feedback control unit corrects a signal level of the focus deviation signal depending on the signal level of the corrected pull-in signal.

11. The optical disc apparatus according to claim 4, further comprising:
    a tracking drive unit configured to drive the objective lens in the radial direction; and
    a tracking feedback control unit configured to feedback control the tracking drive unit based on a tracking error signal, representing a deviation between the focus of the light beam and the mark layer, such that the tracking error signal is held at a reference level, and configured to confirm, based on the sum light quantity of the main return light beam, whether the feedback control of the tracking drive unit is properly executed.

12. The optical disc apparatus according to claim 11, wherein the objective lens causes the sub-beam to be irradiated in a state shifted from the main beam by a half of a track pitch in the radial direction.

13. The optical disc apparatus according to claim 1, wherein the objective lens increases a spot diameter of the sub-beam to be larger than a spot diameter of the main beam such that the sub-beam is irradiated to both the track and a space area where the track is not formed, and
    the signal generating unit generates the mark layer distance signal based on a sub-return light beam resulting from the sub-beam.

14. The optical disc apparatus according to claim 13, wherein the light separator increases the spot diameter of the sub-beam to be larger than the spot diameter of the main beam by making a light flux diameter of the sub-beam smaller than a light flux diameter of the main beam.

15. The optical disc apparatus according to claim 14, wherein the light separator is a diffraction element including a diffraction grating which is formed in an area smaller than a light flux diameter of the light beam.

16. The optical disc apparatus according to claim 1, wherein the signal generating unit selects at least one light beam from among the main beam and the sub-beam, which has been irradiated to the track, and generates the mark layer distance signal based on the at least one selected light beam.

17. The optical disc apparatus according to claim 1, wherein the signal generating unit selects the light beam, which has been irradiated to the track, based on a light quantity of a main return light beam resulting from the main beam and a light quantity of a sub-return light beam resulting from the sub-beam.

18. A signal generation method comprising steps of:
    separating a light beam emitted from a light source into a main beam and a sub-beam;
    when the light beam is condensed and irradiated to an optical disc having a uniform recording layer in which a track is formed by record marks, irradiating at least part of the sub-beam to an area where the main beam is not irradiated in a radial direction which is defined as a direction of radius of the optical disc;
    generating a mark layer distance signal, representing a distance between a focus of the light beam and a mark layer to which the track belongs, based on a return light beam resulting from at least one of the main beam and the sub-beam, which has been irradiated to the track;
    wherein the mark layer distance signal is a corrected pull-in signal having a signal level that increases as the distance between the focus of the light beam and the mark layer decreases.

19. An optical disc apparatus comprising:
a light separator configured to separate a light beam emitted from a light source into a main beam and a sub-beam;
an objective lens configured to, when the light beam is condensed and irradiated to an optical disc having a uniform recording layer in which a track is formed by record marks, irradiate the sub-beam or both the main beam and the sub-beam to both the track and a space area where the track is not formed; and
a signal generating unit configured to generate a mark layer distance signal representing a distance between a focus of the light beam and a mark layer to which the track belongs, based on one or more return light beams resulting from the sub-beam or both the main beam and the sub-beam which have been irradiated to both the track and the space area;
wherein the mark layer distance signal is a corrected pull-in signal having a signal level that increases as the distance between the focus of the light beam and the mark layer decreases.

* * * * *